United States Patent
Nakashima et al.

(10) Patent No.: US 8,954,761 B2
(45) Date of Patent: Feb. 10, 2015

(54) METHOD AND SYSTEM OF CONTROLLING POWER SUPPLY OF AN INFORMATION PROCESSING DEVICE INCLUDING LOAD INFORMATION

(75) Inventors: Yoshiyasu Nakashima, Kawasaki (JP); Satoshi Kazama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 330 days.

(21) Appl. No.: 12/588,800

(22) Filed: Oct. 28, 2009

(65) Prior Publication Data

US 2010/0162008 A1 Jun. 24, 2010

(30) Foreign Application Priority Data

Dec. 18, 2008 (JP) ................. 2008-322724

(51) Int. Cl.
*G06F 1/00* (2006.01)
*G06F 1/26* (2006.01)
*G06F 1/32* (2006.01)

(52) U.S. Cl.
CPC .............. *G06F 1/263* (2013.01); *G06F 1/3203* (2013.01); *G06F 1/3296* (2013.01); *Y02B 60/1285* (2013.01)
USPC ............................ 713/300; 713/320; 713/330

(58) Field of Classification Search
CPC ......... G06F 1/3202; G06F 1/26; G06F 1/266; G06F 1/206; H04L 12/10
USPC ......................................... 713/300, 320, 330
See application file for complete search history.

(56) References Cited

U.S. PATENT DOCUMENTS

| | | | |
|---|---|---|---|
| 4,425,612 A * | 1/1984 | Bahler et al. ................ | 363/21.13 |
| 7,206,949 B2 * | 4/2007 | Kuranuki ...................... | 713/320 |
| 7,294,993 B2 * | 11/2007 | Clavette et al. .............. | 323/282 |
| 7,906,950 B2 * | 3/2011 | Bandholz et al. ............ | 323/283 |
| 2003/0125900 A1 | 7/2003 | Orenstien et al. | |
| 2006/0001408 A1* | 1/2006 | Southwell et al. ........... | 323/282 |
| 2007/0085521 A1* | 4/2007 | Nagai ........................... | 323/283 |
| 2009/0085527 A1* | 4/2009 | Odaohhara ................... | 320/150 |

(Continued)

FOREIGN PATENT DOCUMENTS

| | | |
|---|---|---|
| EP | 1742322 A2 | 1/2007 |
| GB | 2341247 A | 3/2000 |
| JP | 2000-78849 | 3/2000 |

(Continued)

OTHER PUBLICATIONS

Extended European Search Report mailed Jan. 27, 2014 in corresponding European Application No. 09174730.3.

(Continued)

*Primary Examiner* — Zahid Choudhury
(74) *Attorney, Agent, or Firm* — Staas & Halsey LLP

(57) ABSTRACT

An information processing device is provided. The information processing device which operates upon receipt of power supply from a power unit connected to an alternative current power source or from a battery includes an obtaining unit which obtains load information of parts included in the information processing device itself, a deciding unit which decides a voltage value to be supplied by the power unit which supplies electric power to the information processing device, based on the load information obtained by the obtaining unit, and an output unit which outputs a signal relative to the voltage value decided by the deciding unit to the power unit.

18 Claims, 27 Drawing Sheets

(56) References Cited

U.S. PATENT DOCUMENTS

2009/0147553 A1* 6/2009 Ryu et al. .................. 363/65
2010/0017636 A1* 1/2010 Hashimoto et al. .......... 713/322

FOREIGN PATENT DOCUMENTS

| JP | 2003-169470 | 6/2003 |
| JP | 2003-256069 | 9/2003 |
| JP | 2007-172108 | 7/2007 |

OTHER PUBLICATIONS

Japanese Office Action mailed Oct. 15, 2013 in corresponding Japanese Application No. 2008-322724.
Japanese Office Action mailed Apr. 16, 2013 for corresponding Japanese Application No. 2008-322724.
European Office Action issued Jul. 2, 2014 in corresponding European Patent Application No. 09 174 730.3.

* cited by examiner

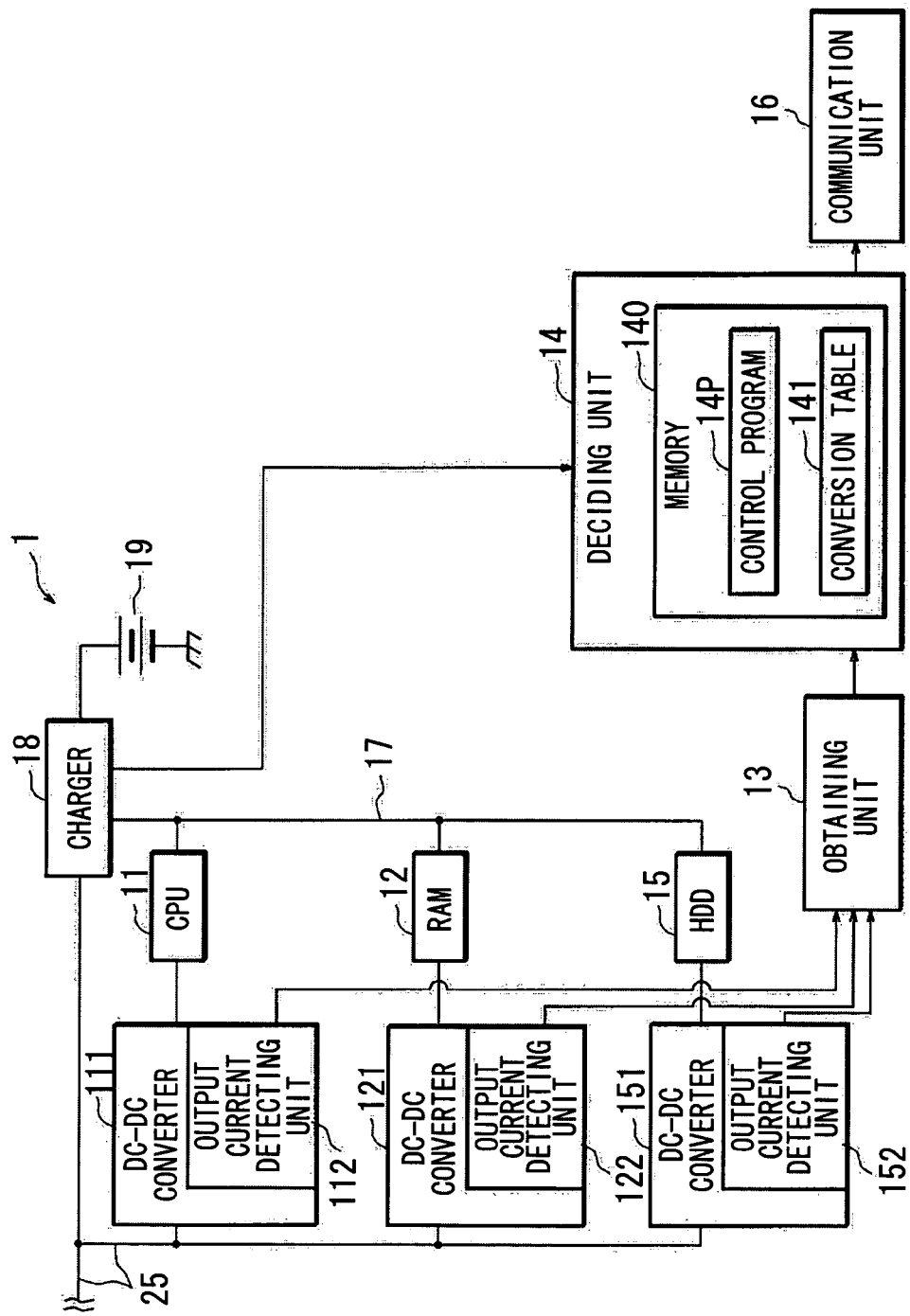

FIG. 4A

CONVERSION TABLE ~141

| CPU CURRENT CONSUMPTION(A) | VOLTAGE VALUE(V) |
|---|---|
| LESS THAN 1.0 | 6.0 |
| 1.0 TO LESS THAN 3.0 | 7.5 |
| 3.0 TO LESS THAN 4.0 | 9.0 |
| 4.0 AND MORE | 16.0 |

FIG. 4B

CONVERSION TABLE ~141

| WHOLE CURRENT CONSUMPTION(A) | VOLTAGE VALUE(V) |
|---|---|
| LESS THAN 2.0 | 6.0 |
| 2.0 TO LESS THAN 4.0 | 7.5 |
| 4.0 TO LESS THAN 5.0 | 9.0 |
| 5.0 AND MORE | 16.0 |

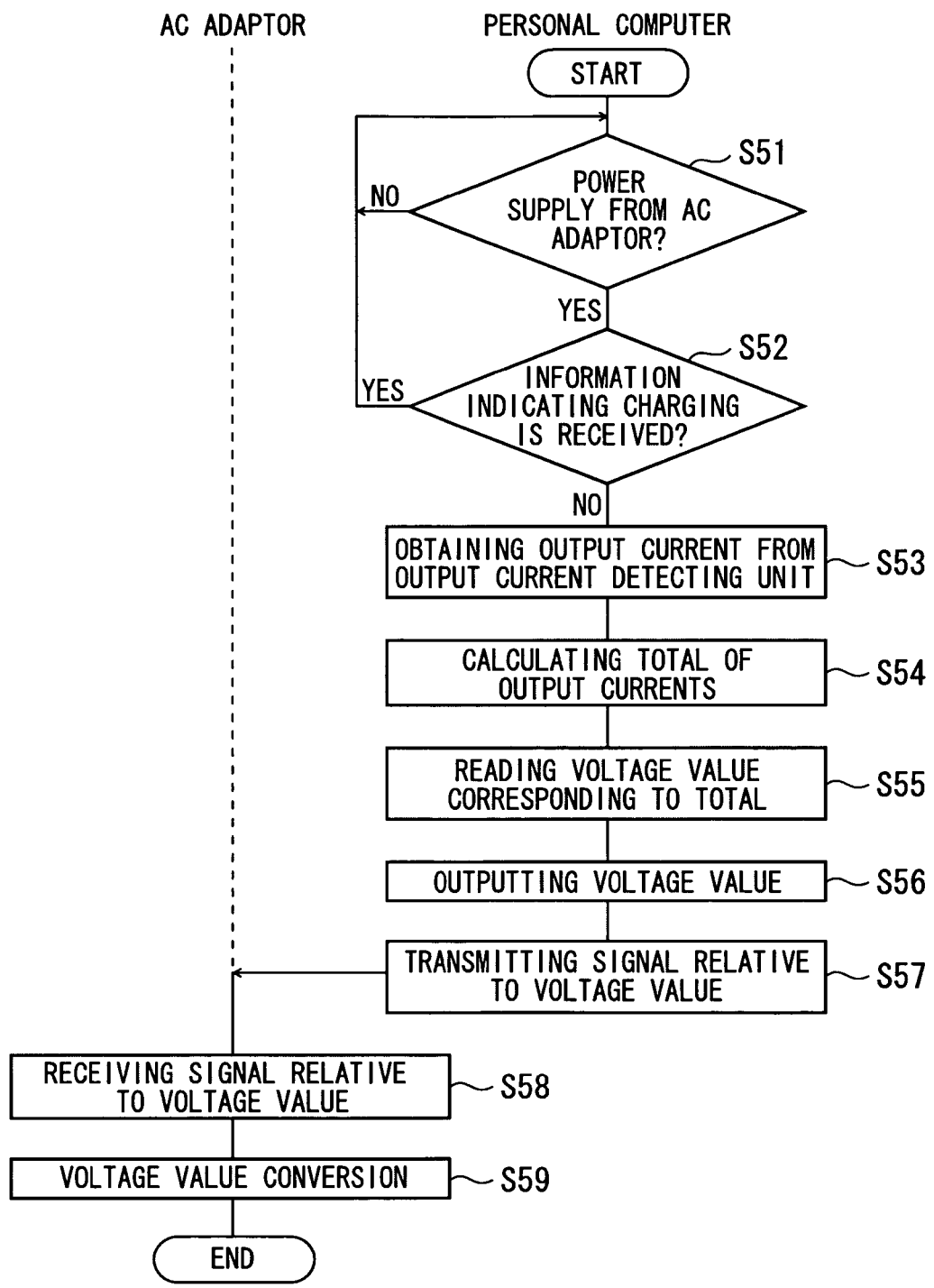

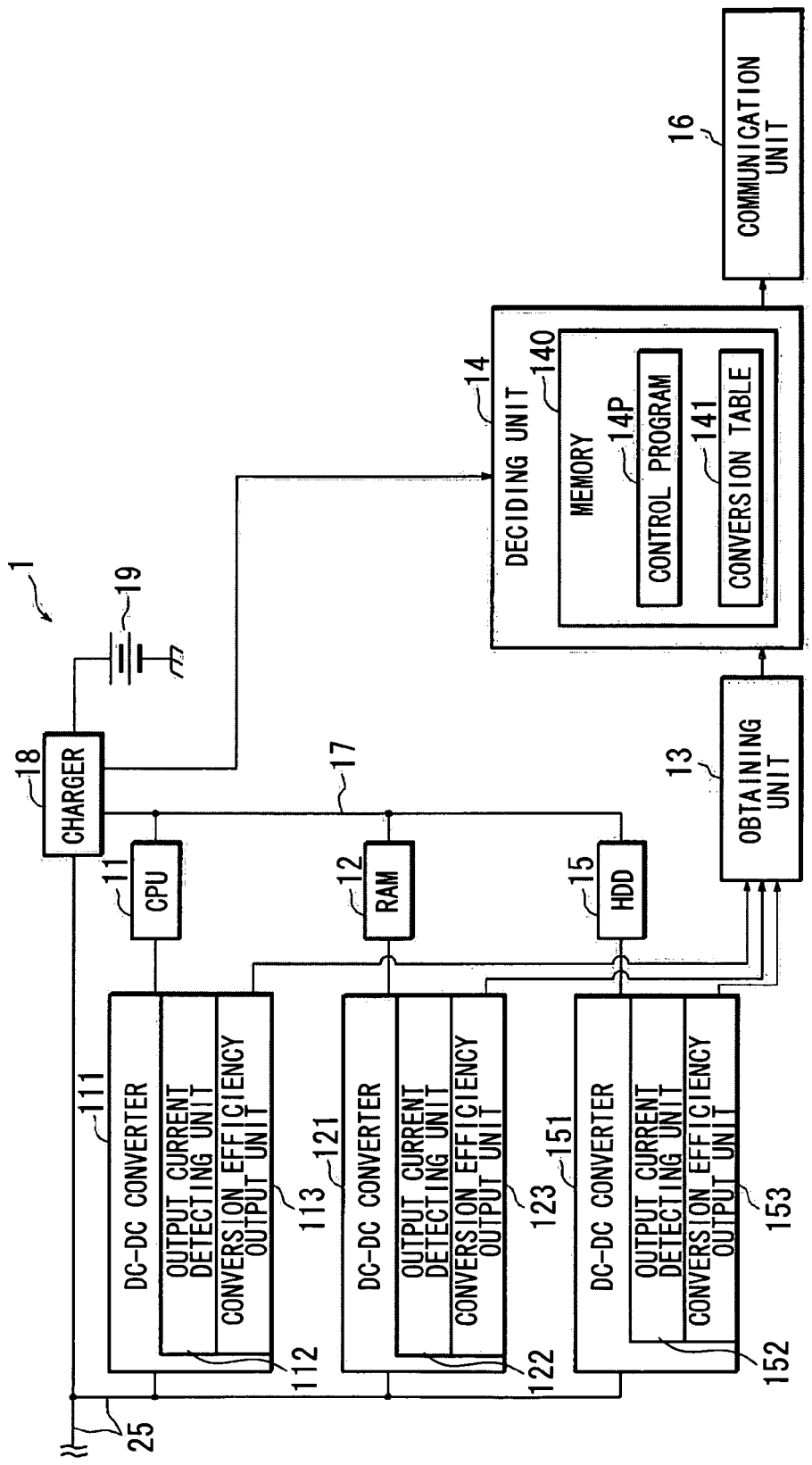

FIG. 7

CONVERSION TABLE —141

| AVERAGE CONVERSION EFFICIENCY (%) | VOLTAGE VALUE (V) |
|---|---|
| LESS THAN 85 | 6.0 |
| 85 TO LESS THAN 87 | 7.5 |
| 88 TO LESS THAN 92 | 9.0 |
| 93 AND MORE | 16.0 |

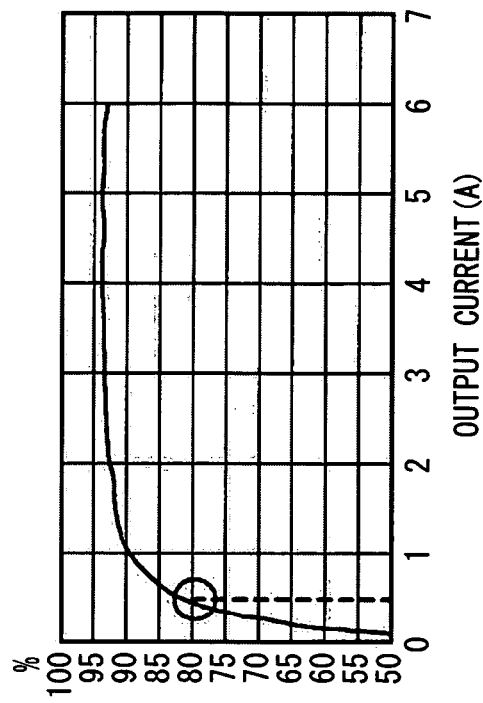
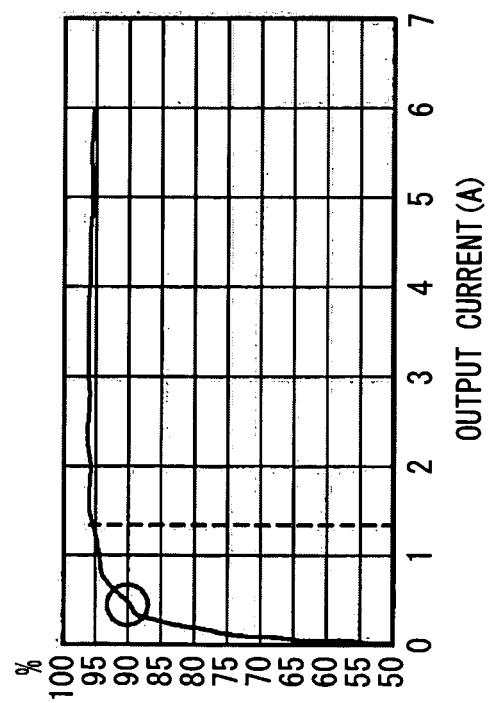

FIG. 11

| HDD LOAD (W) | AC ADAPTOR SIDE ||||  HDD SIDE ||  WHOLE LOSS (W) |
|---|---|---|---|---|---|---|---|
|  | VOLTAGE (V) | CURRENT (A) | Vf (V) | LOSS (W) | DC EFFICIENCY (%) | LOSS (W) |  |
| 8 | 6 | 1.333 | 0.95 | 1.27 | 95 | 0.40 | 1.67 |
| 8 | 16 | 0.500 | 0.75 | 0.38 | 80 | 1.60 | 1.98 |

FIG. 14

| WEIGHT FILE | ~142 |
|---|---|
| TARGET HARDWARE | WEIGHT |
| CPU | 1.2 |
| RAM | 0.95 |
| HDD | 1.0 |

FIG. 17A

CONVERSION TABLE ~141

| CPU LOAD RATE (%) | VOLTAGE VALUE (V) |
|---|---|
| LESS THAN 20 | 6.0 |
| 20 TO LESS THAN 30 | 7.5 |
| 30 TO LESS THAN 50 | 9.0 |
| 50 AND MORE | 16.0 |

FIG. 17B

CONVERSION TABLE ~141

| AVERAGE LOAD RATE (%) | VOLTAGE VALUE (V) |
|---|---|
| LESS THAN 15 | 6.0 |
| 15 TO LESS THAN 25 | 7.5 |
| 25 TO LESS THAN 40 | 9.0 |
| 40 AND MORE | 16.0 |

FIG. 22

SECOND CONVERSION TABLE ~142

| TOTAL OF OUTPUT CURRENTS (A) | LOAD RATE (%) |
|---|---|
| LESS THAN 2.0 | 20 |
| 2.0 TO LESS THAN 3.9 | 25 |
| 4.0 TO LESS THAN 4.9 | 40 |
| 5.0 AND MORE | 60 |

METHOD AND SYSTEM OF CONTROLLING POWER SUPPLY OF AN INFORMATION PROCESSING DEVICE INCLUDING LOAD INFORMATION

CROSS-REFERENCE TO RELATED APPLICATION(S)

This application is related to and claims priority to Japanese Patent Application No. 2008-322724 filed on Dec. 18, 2008 and incorporated by reference herein.

BACKGROUND

1. Field

The embodiments discussed herein are directed to an information processing device, information processing system, program, and controller which operate upon receipt of power supply from a power unit connected to an alternating current power source or from a battery.

2. Description of the Related Art

A voltage lowered by an AC-DC converter within the power unit may be supplied to an information processing device which operates upon receipt of power supply from an alternating current power source.

A conventional art reference of JA-A 2000-78849 discusses that a power supply system which controls the voltage supplied to this information processing device, according to the charged state or non-charged state of a battery within the information processing device.

SUMMARY

It is an aspect of the embodiments discussed herein to provide an information processing device which operates upon receipt of power supply from a power unit connected to an alternative current power source or from a battery.

The information processing device includes an obtaining unit which obtains load information of parts included in the information processing device itself, a deciding unit which decides a voltage value to be supplied by the power unit which supplies electric power to the information processing device, based on the load information obtained by the obtaining unit, and an output unit which outputs a signal relative to the voltage value decided by the deciding unit to the power unit. These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 illustrates exemplary hardware of a personal computer.
FIG. 4A illustrates an exemplary record layout of a conversion table.
FIG. 4B illustrates an exemplary record layout of another conversion table.
FIG. 5 illustrates an exemplary procedure of voltage value deciding processing.
FIG. 6 illustrates an exemplary hardware of a personal computer according to a second embodiment.
FIG. 7 illustrates an exemplary record layout of a conversion table according to the second embodiment.
FIG. 9A illustrates a change of conversion efficiency with respect to output current.
FIG. 9B illustrates a change of conversion efficiency with respect to output current.
FIG. 11 illustrates exemplary experiment results.
FIG. 14 illustrates an exemplary record layout of a weight file.
FIG. 17A illustrates an exemplary record layout of a conversion table.
FIG. 17B illustrates an exemplary record layout of another conversion table.
FIG. 22 illustrates an exemplary record layout of a second conversion table.

DETAILED DESCRIPTION OF THE EMBODIMENTS

The conventional power supply system has a problem that it still has a lot of energy loss because of just detecting the charged state/non-charged state of a battery.

A device according to an exemplary embodiment can reduce the energy loss by deciding a voltage to be output by a power unit, according to the state of a load on the parts within the information processing device ("inside parts").

From a viewpoint of the device, it is possible to change a voltage value to be output by the power unit, at real time, according to the situation of the load on the inside parts.

As a result, an exemplary embodiment obtains an excellent advantage such as a reduction in the energy loss.

Figure 1:
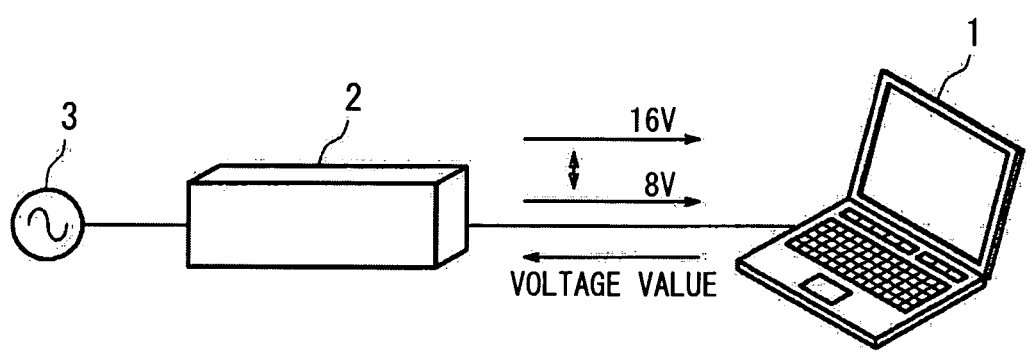
FIG. 1 illustrates an information processing system.

FIG. 1 illustrates an information processing system.

The information processing system includes an information processing device 1, a power unit 2, and an alternating current power source 3.

An alternating current voltage, for example, of 100 V may be supplied from the alternating current power source 3 to the power unit 2 such as an AC-DC adaptor.

The power unit 2 converts an alternating current voltage into a direct current voltage, further lowers the voltage, for example, to 16 V, and then supplies the lowered direct current voltage to the information processing device 1.

The information processing device 1 is a device which operates upon receipt of power supply, for example, from the power unit 2 or a battery.

The information processing device 1 includes, for example, a laptop personal computer, a PDA (Personal Digital Assistant), a portable game machine, a cellular phone, a portable DVD (Digital Versatile Disc) player, a portable music player, a video camera, and the like.

The information processing device 1 may be applied to a laptop personal computer.

Hereinafter, the information processing device 1 is referred to as a personal computer 1 and the power unit 2 is referred to as an AC adaptor 2.

According to an exemplary embodiment the AC adaptor 2 and the personal computer 1 may be separate and connected to each other through a power line; however, it is not restricted to this case.

For example, the power unit 2 may be built in the personal computer 1 as a built-in switching power unit.

An outline of an exemplary embodiment is disclosed.

A lowered voltage 16 V may be s supplied from the AC adaptor 2 to the personal computer 1.

The personal computer 1 obtains the information about a load on the inside parts different from a battery of the personal computer 1, for example, a CPU (Central Processing Unit) or a memory.

The personal computer 1 decides a voltage value to be output by the AC adaptor 2, according to the load information.

The personal computer 1 outputs a signal indicating the decided voltage value to the AC adaptor 2.

For example, when the load of the personal computer 1 is small, it decides the voltage value at 8 V in order to reduce the energy loss.

The AC adaptor 2 lowers the voltage value to be output to the personal computer 1 to 8 V, upon receipt of the signal indicating 8 V.

On the other hand, when the load of the personal computer 1 is high, it decides the voltage value at 16 V again.

Upon receipt of this, the AC adaptor 2 raises the voltage value up to 16 V again.

The numeric values described in this embodiment are not restricted to these but indicated just as one example.

Other aspects of an exemplary embodiment are disclosed hereinafter.

Figure 2:
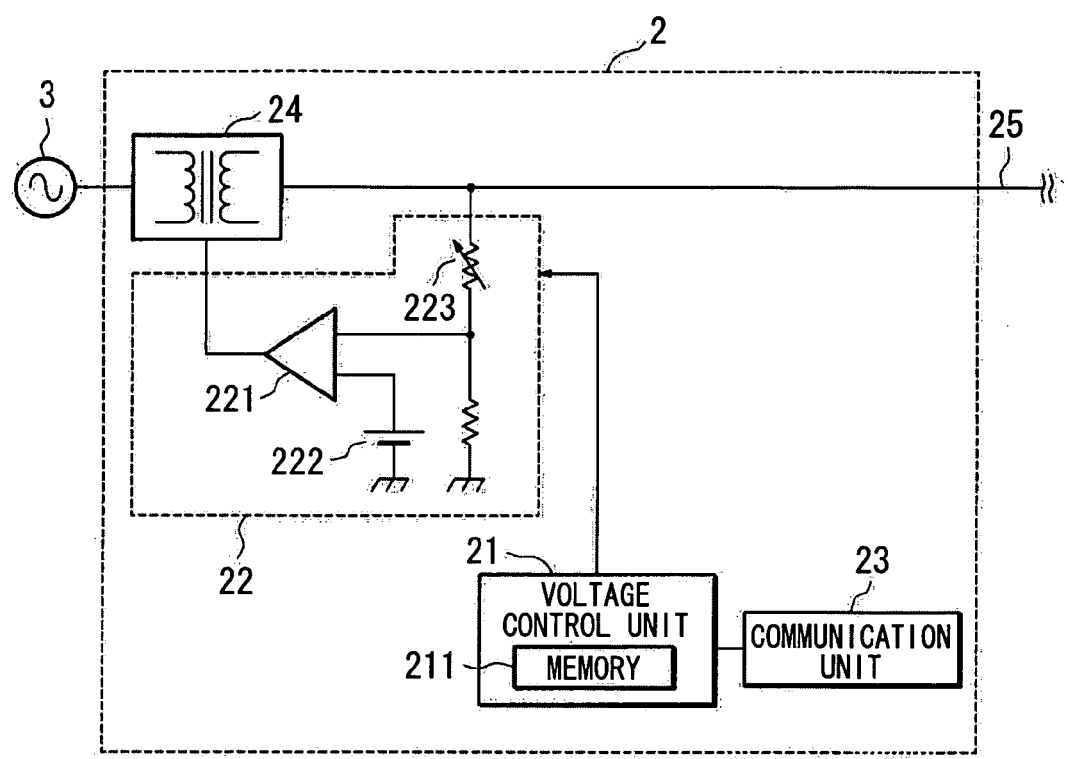
FIG. 2 illustrates exemplary hardware of an AC adaptor.

FIG. 2 illustrates hardware of the AC adaptor 2.

The AC adaptor 2 includes a voltage control unit 21 as a conversion unit, an output adjustment unit 22, a communication unit 23, an output conversion unit 24, and a power line 25.

The output conversion unit 24 is a unit that may be supplied with an alternating current voltage of 100V from the alternating current source 3. The output conversion unit 24 is a unit that transforms, rectifies, and smoothes the alternating current voltage, hence to convert it into a direct current voltage.

The output adjustment unit 22 is a unit that lowers the output voltage from the output conversion unit 24 and supplies the lowered direct current voltage to the personal computer 1 through the power line 25.

The output adjustment unit 22 includes a comparator 221, a reference voltage 222, and a variable resister 223.

The output adjustment unit 22 is a unit that compares the reference voltage 222 with the output voltage from the output conversion unit 24, and adjusts the voltage according to a feedback control, hence to make the output voltage constant.

The voltage control unit 21 is a unit that raises or lowers the output voltage by controlling the variable resister 223.

The communication unit 23 is a unit that receives a signal from the corresponding communication unit of the personal computer 1. The communication unit 23 is, for example, a transceiver which performs a short distance wireless communication such as Bluetooth (registered trademark) and it.

This signal which the communication unit 23 receives includes a voltage value to be output from the AC adaptor 2 to the personal computer 1 and the communication unit 23 outputs the received signal to the voltage control unit 21.

The voltage control unit 21 is a unit that controls the variable resister 223, according to the voltage value output from the communication unit 23, with reference to the memory 211 which stores a control amount of the variable resister 223 depending on each voltage value.

FIG. 3 illustrates the hardware of the personal computer 1.

The personal computer 1 includes a CPU 11, a RAM (Random Access Memory) 12, a storing unit 15, a charger 18, battery 19, an obtaining unit 13, a deciding unit 14, a communication unit 16, and DC-DC converters 111, 121, and 151.

The CPU 11 is a unit that executes various software functions, according to a control program stored in the storing unit 15 such as a hard disk.

The CPU 11 is connected to the respective hardware units of the personal computer 1 through a bus 17, to control them.

The description of a display and a keyboard is omitted.

The storing unit 15 is referred to as HDD 15, below.

The charger 18, the battery 19, and the DC-DC converters 111, 121, and 151 (represented by 100 in some cases) as the voltage conversion unit may be connected to the power line 25.

The respective DC-DC converters 111, 122, and 151 are connected to the CPU 11, the RAM 12, and the HDD 15 that are the inside parts.

The DC-DC converter 111 is a unit that converts (lowers) the voltage (for example, 16 V) supplied from the battery 19 or the AC adaptor 2, for example, into 1.5 V.

The direct current voltage lowered by the DC-DC converter 111 may be supplied to the CPU 11.

The DC-DC converter 111 includes an output current detecting unit 112 which detects an output current to be output from the DC-DC converter 111 to the CPU 11.

The output current detecting unit 112 is a unit that outputs the output current of the DC-DC converter 111 to the obtaining unit 13 as the load information of the CPU 11.

This embodiment has made a description of the case where the DC-DC converter 111 includes the output current detecting unit 112 which detects an output current through an inner microcomputer but it is not restricted to this case.

For example, a resistance for current detection may be provided between the DC-DC converter 111 and the CPU 11 in series, to detect an output current by using the resistance.

Similarly, the DC-DC converter 121 is a unit that lowers the voltage (for example, 16 V) supplied from the battery 19 or the AC adaptor 2, for example, into 2.5 V.

The direct current voltage lowered by the DC-DC converter 121 may be supplied to the RAM 12.

The DC-DC converter 121 includes an output current detecting unit 122 which detects an output current to be output from the DC-DC converter 121 to the RAM 12.

The output current detecting unit 122 outputs the output current of the DC-DC converter 121 to the obtaining unit 13 as the load information of the RAM 12.

The DC-DC converter 151 lowers the voltage (for example, 16 V) supplied from the battery 19 or the AC adaptor 2, for example, into 5.0 V.

The direct current voltage lowered by the DC-DC converter 151 may be supplied to the HDD 15.

The DC-DC converter 151 includes an output current detecting unit 152 which detects an output current to be output from the DC-DC converter 151 to the HDD 15.

The output current detecting unit 152 outputs the output current of the DC-DC converter 151 to the obtaining unit 13 as the load information of the HDD 15.

Although a description is made in this embodiment, by way of example, taking the DC-DC converters 100 provided in the CPU 11, the RAM 12, and the HDD 15 as the inside parts (hereinafter, referred to as hardware) other than the battery 19, in order to make the description brief, it is not restricted to this.

The DC-DC converter 100 may be provided also in the other hardware different from the battery 19.

The DC-DC converter 100 may be connected, for example, to an LCD backlight, a wireless LAN (Local Area Network) card, a playback or recording device for a portable recording medium such as Blue-ray disc, and an input/output device such as a USB (Universal Serial Bus) port.

Further, although this embodiment describes an example of control by using output currents from a plurality of DC-DC converters 100, it is needless to say that a control is performed only by using an output current, for example, from one DC-DC converter 111.

The charger 18 is a unit that charges the battery 19.

During charging, the charger 18 outputs the information indicating that the battery 19 is being charged, to the CPU 11 and the deciding unit 14.

While the charger 18 is not charging, it supplies the information indicating no charging to the CPU 11 and the deciding unit 14.

Further, the charger 18 outputs the information indicating power supply from the battery 19 or power supply from the AC adaptor 2, to the CPU 11 and the deciding unit 14.

Here, the information indicating charging may be output only to the CPU 11, and the CPU 11 may output the information indicating that the battery 19 is being charged, to the deciding unit 14.

The obtaining unit 13 is a unit that obtains the output currents output from the output current detecting units 112, 122, and 152 (hereinafter, represented by 110 in some cases).

The obtaining unit 13 outputs the obtained output currents to the deciding unit 14.

The deciding unit 14 is a microcomputer including a memory 140, which decides a voltage value to be output by the AC adaptor 2, according to a control program 14P stored in the memory 140.

The deciding unit 14 decides a voltage value, with reference to the output currents output from obtaining unit 13 and the conversion table 141 within the memory 140.

FIGS. 4A and 4B illustrate the record layouts of the respective conversion tables 141.

FIG. 4A illustrates the conversion table 141 which is referred to when making use of the output current from the DC-DC converter 111 which lowers the voltage to be supplied to the CPU 11, as the load information.

The conversion table 141 includes a CPU current consumption field and a voltage value field.

The conversion table 141 illustrated in FIG. 4A stores each voltage value to be output by the AC adaptor 2, in accordance with each output current of one DC-DC converter 100.

The conversion table stores the voltage values in the order of increasing according to an increase in the current consumption in the CPU 11, namely, according to an increase in the output current of the DC-DC converter 111.

For example, when the CPU 11 is in full operation and the output current is 5.0 A, the voltage value becomes 16.0 V as usual.

On the other hand, when the CPU 11 does not run so much and the output current is 1.5 A, the voltage 7.5 V is stored in the conversion table 141 in order to reduce the voltage value.

FIG. 4B illustrates the conversion table 141 which is referred to when making use of the total of three output currents of the DC-DC converters 111, 121, and 151 as the load information.

The conversion table illustrated in FIG. 4B includes a whole current consumption field and a voltage value field.

The conversion table illustrated in FIG. 4B stores each voltage value corresponding to each total of the output currents output from a plurality of DC-DC converters 100.

When the total of the output currents is, for example, 5.2 A, the voltage value corresponding to the total of the output currents is 16.0 V.

When the total of the output currents is 1.8 A, the voltage value corresponding to the total of the output currents is 6.0 V.

An example of using the conversion table illustrated in FIG. 4B is disclosed.

The deciding unit 14 calculates the total of the output currents obtained by the obtaining unit 13 and reads out the corresponding voltage value from the conversion table 141, to decide a voltage value.

Although this embodiment describes the example of calculating the total of the output currents, it is not restricted to this example.

An average value of the output currents may be calculated and a voltage value corresponding to the average value may be read out with reference to the conversion table 141 with each voltage value stored according to each average value.

Although the embodiment describes the example of using the conversion table 141, an expression for requiring a voltage value corresponding to each output current, each total of the output currents, or each average value of the output currents may be used, instead of the conversion table 141.

In this case, the deciding unit 14 reads out the expression stored in the memory 140, and substitutes the output current into the expression, hence to require a voltage value.

The voltage value decided as mentioned above is output from the deciding unit 14 to the communication unit 16.

The communication unit 16 as the output unit transmits a signal relative to the voltage value to the communication unit 23 of the AC adaptor 2.

Similarly to the communication unit 23, a transceiver for a short distance wireless communication such as Bluetooth (registered trademark) may be used for the communication unit 16.

The communication unit 23 illustrated in FIG. 2 receives a signal relative to the voltage value.

The communication unit 23 outputs the received voltage value to the voltage control unit 21.

The voltage control unit 21 reads out a control amount of the variable resister 223 corresponding to the voltage value, with reference to the memory 211.

The voltage control unit 21 controls the variable resister 223 according to the control amount.

According to this, a voltage value to be output is properly changed in the output conversion unit 24.

Accordingly, for example, when the current consumption of the CPU 11 is low, the voltage is lowered from 16 V to 6 V.

On the other hand, when the current consumption is high, it is raised to 16 V.

As mentioned above, a proper voltage conversion can be performed depending on the load situation of the personal computer 1, hence to reduce the energy loss.

In the above hardware structure, the procedure of voltage value deciding processing will be described by using a flow chart.

FIG. 5 illustrates a voltage value deciding processing.

The deciding unit 14 of the personal computer 1 executes the following processing, according to the control program 14P.

The deciding unit 14 checks whether or not it has received the information indicating that power supply from the charger 18 is performed through the AC adaptor 2 (Operation S51).

When the deciding unit 14 has not received the above information (No in Operation S51), the deciding unit 14 is on standby until receiving the above information.

When the deciding unit 14 has received the above information (YES in Operation S51), it checks whether or not it has received the information indicating charging from the charger 18 (Operation S52).

In the case of receiving the above information indicating that the battery 19 is being charged (YES in Operation S52), the deciding unit 14 returns the processing to Operation S51.

When the deciding unit 14 has not received the information indicating charging (No in Operation S52), it obtains the output currents from the output current detecting units 110 through the obtaining unit 13 (Operation S53).

The deciding unit 14 calculates the total of the output currents (Operation S54).

The deciding unit 14 reads out a voltage value corresponding to the total from the conversion table 141 (Operation S55).

The deciding unit 14 outputs the read voltage value to the communication unit 16 (Operation S56).

The communication unit 16 transmits a signal indicating the voltage value to the communication unit 23 (Operation S57).

The communication unit 23 of the AC adaptor 2 receives the signal relative to the voltage value (Operation S58).

The voltage control unit 21 of the AC adaptor 2 converts the voltage value by controlling the variable resister 223 (Operation S59).

A second embodiment relates to a form of using conversion efficiency of the DC-DC converter 100 as load information.

FIG. 6 illustrates an exemplary personal computer 1 according to the second embodiment.

The DC-DC converters 111, 121, and 151 are respectively provided with conversion efficiency output units 113, 123, and 153 (hereinafter, represented by 120 in some cases).

The conversion efficiency output unit 120 outputs the conversion efficiency corresponding to the output current detected by the output current detecting unit 112, to the obtaining unit 13 as the load information.

The respective DC-DC converters 100 have a table illustrating a change characteristic of the conversion efficiency with respect to a change of the output current.

This table stores conversion efficiency (%) for each output current in every voltage value supplied to the DC-DC converter 100.

The conversion efficiency output unit 120 reads out a conversion efficiency corresponding to the supplied voltage value and output current from the table and supplies the read conversion efficiency to the obtaining unit 13.

FIG. 7 illustrates a record layout of the conversion table 141 according to the second embodiment.

The conversion table 141 includes an average conversion efficiency field and a voltage value field.

The conversion table 141 stores a voltage value corresponding to average conversion efficiency.

The deciding unit 14 calculates an average value of three conversion efficiencies output from the conversion efficiency output units 113, 123, and 153.

The deciding unit 14 reads out a voltage value corresponding to the average value of the conversion efficiencies from the conversion table 141.

The deciding unit 14 outputs the read voltage value to the communication unit 16.

The conversion table 141 stores the voltage values in the order of increasing according to a raise in the conversion efficiency.

This enables a proper conversion of the voltage values supplied at real time depending on the load situation in the personal computer 1.

Although this embodiment has described the example of using the average value of the conversion efficiencies, the total may be used or only one conversion efficiency may be used.

Further, instead of the conversion table 141, an expression may be used to calculate a voltage value.

Figure 8:
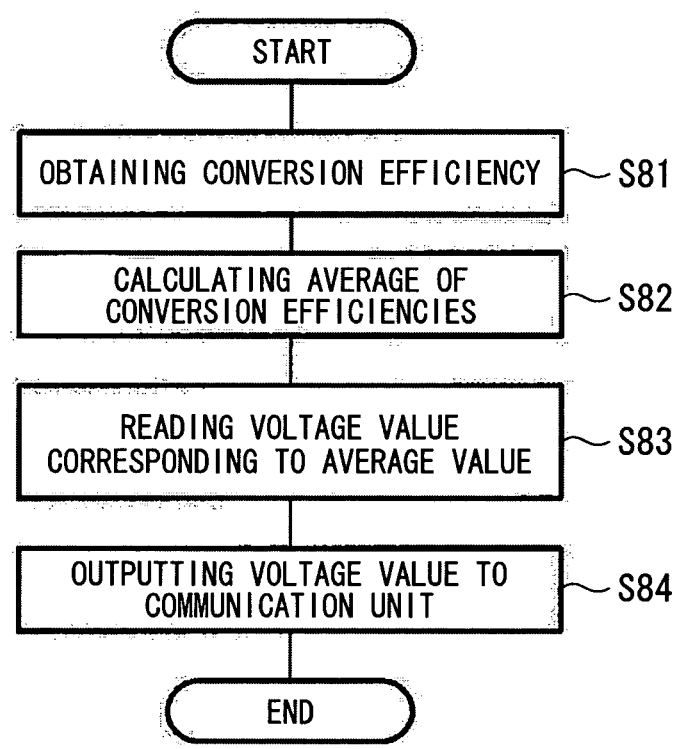
FIG. 8 illustrates an exemplary procedure of voltage value deciding processing according to the second embodiment.

FIG. 8 illustrates voltage value deciding processing according to the second embodiment.

The deciding unit 14 performs the following processing after NO in Operation S52 in the first embodiment.

The deciding unit 14 obtains the conversion efficiencies from the conversion efficiency output units 113, 123, and 153 through the obtaining unit 13 (Operation S81).

The deciding unit 14 calculates the average value of the conversion efficiencies (Operation S82).

The deciding unit 14 reads out a voltage value corresponding to the average value from conversion table 141 (Operation S83).

The deciding unit 14 outputs the read voltage value to the communication unit 16 (Operation S84).

Although this embodiment has described the example of transmitting a concrete voltage value to the AC adaptor 2 as a signal relative to the voltage value, it is not restricted to this example.

For example, with a reference voltage defined as 16 V, the information of the ratio with respect to the reference may be transmitted as a signal relative to the voltage value.

In this case, the information such as 50% is transmitted from the personal computer 1 to the AC adaptor 2.

The AC adaptor 2 receives the information of the ratio such as 50%, and it lowers the voltage, for example, from 16 V to 8 V according to the ratio.

Next, the effect of the embodiment will be examined.

In an experiment, the DC-DC converter 100 with the output voltage of 5 V is used, and input voltages, namely, the voltage values of the AC adaptor 2 are respectively defined as 6 V and 16 V.

FIGS. 9A and 9B are characteristic views each illustrating a change in the conversion efficiency with respect to the output current.

The horizontal axis illustrates the output current in the unit of ampere, and the vertical axis illustrates the conversion efficiency of the DC-DC converter 100 in the unit of percent.

FIG. 9A illustrates a change in the conversion efficiency with respect to the output current when the input voltage is 6 V.

FIG. 9B illustrates a change in the conversion efficiency with respect to the output current when the input voltage is 16 V.

For example, when the output current (load current) indicated by a circle is in a low load state such as 0.5 A, it can be understood that the lower voltage of 6 V (FIG. 9A) has better conversion efficiency.

In the low load mode, the conversion efficiency is raised from 80% to 90% in the case of 16 V.

Namely, the energy loss can be reduced from 20% to 10%.

Here, each dotted line in parallel to the vertical axis in FIG. 9 will be described later.

According to this, the input voltage is lowered in the light load mode of the personal computer 1, hence to improve the DC-DC conversion efficiency in the personal computer 1.

Further, improvement in the conversion efficiency can restrain heat generation.

Next, the energy losses generated both in the AC adaptor 2 and the personal computer 1 are examined.

The experiment was made only on the HDD 15 of the personal computer 1 with the power consumption of the HDD 15 defined as 8 W.

Each energy loss is required in the respective cases of the voltage values 16 V and 6 V in the AC adaptor 2.

Figure 10:
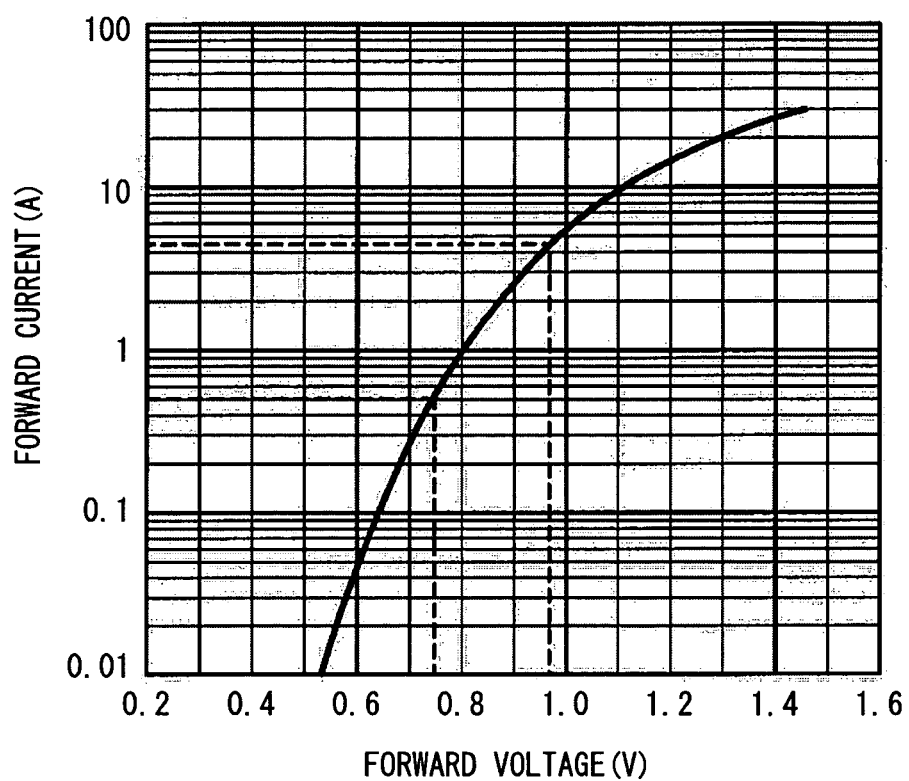
FIG. 10 illustrates an exemplary I-V characteristics of a diode installed on the output side of an output conversion unit of an AC adaptor.

FIG. 10 is a graph illustrating I-V characteristics of a diode (not illustrated) installed on the output side of the output conversion unit 24 of the AC adaptor 2.

The horizontal axis indicates a forward voltage in the unit of volt, and the vertical axis indicates a forward current in the unit of ampere.

FIG. 11 illustrates experimental results.

When the load of the HDD 15 is 8 W and the voltage value is 16 V, the forward current of the diode is 0.5 A.

When the load is 8 W and the voltage value is 6 V, the forward current of the diode is 1.333 A.

According to the graph illustrated in FIG. 9, the forward voltage corresponding to the forward current is 0.75 V with respect to the forward current 0.5 A and is 0.95 V with respect to the forward current 1.333 A.

As mentioned above, the energy loss on the side of the AC adaptor 2 is 0.38 W in the case of 16 V and is 1.27 W in the case of 6 V as the result of multiplying the forward current by the forward voltage.

The loss of the HDD 15 in the personal computer 1 is disclosed.

It is found that the conversion efficiency of the DC-DC converter 100 is 95% with respect to the forward current of 1.333 A in the case of the voltage 6 V, according to the characteristic view in FIG. 9A (refer to the dotted line).

Further, it is found that the conversion efficiency of the DC-DC converter 100 is 80% with respect to the forward current of 0.5 A in the case of the voltage 16 V, according to the characteristic view of FIG. 9B (refer to the dotted line).

The energy loss of the HDD 15 is 0.40 W in the case of 1.333 A, the input voltage of 6 V, and the conversion efficiency of 95%.

On the other hand, in the case of 0.5 A, the input voltage of 16 V and the conversion efficiency of 80%, the energy loss is 1.60 W.

As the result, when the both energy losses are summed up, it can be confirmed that the whole energy loss in the voltage value of 16 V is 1.98 W, while the whole energy loss in the lower voltage value of 6 V can be reduced to 1.67 W.

The second embodiment includes similar items as the first embodiment; the same reference numerals as used in the first embodiment are respectively attached to the corresponding identical portions in the second embodiment and their detailed description is omitted.

A third embodiment relates to a form of superimposing a signal relative to a voltage value on the power line 25.

The first embodiment and the second embodiment have described the example of transmitting a signal relative to a voltage values through a wireless communication between the communication units 16 and 23; however, the signal may be transmitted through a fixed line.

A signal relative to an analog or digital voltage value is superimposed on the power line 25, thereby to transmit the signals.

Alternatively, another line for communication different from the power line 25 may be provided and the signals may be transmitted through the line.

This embodiment will be described taking the example of superimposing a digital signal on the power line 25.

Figure 12:
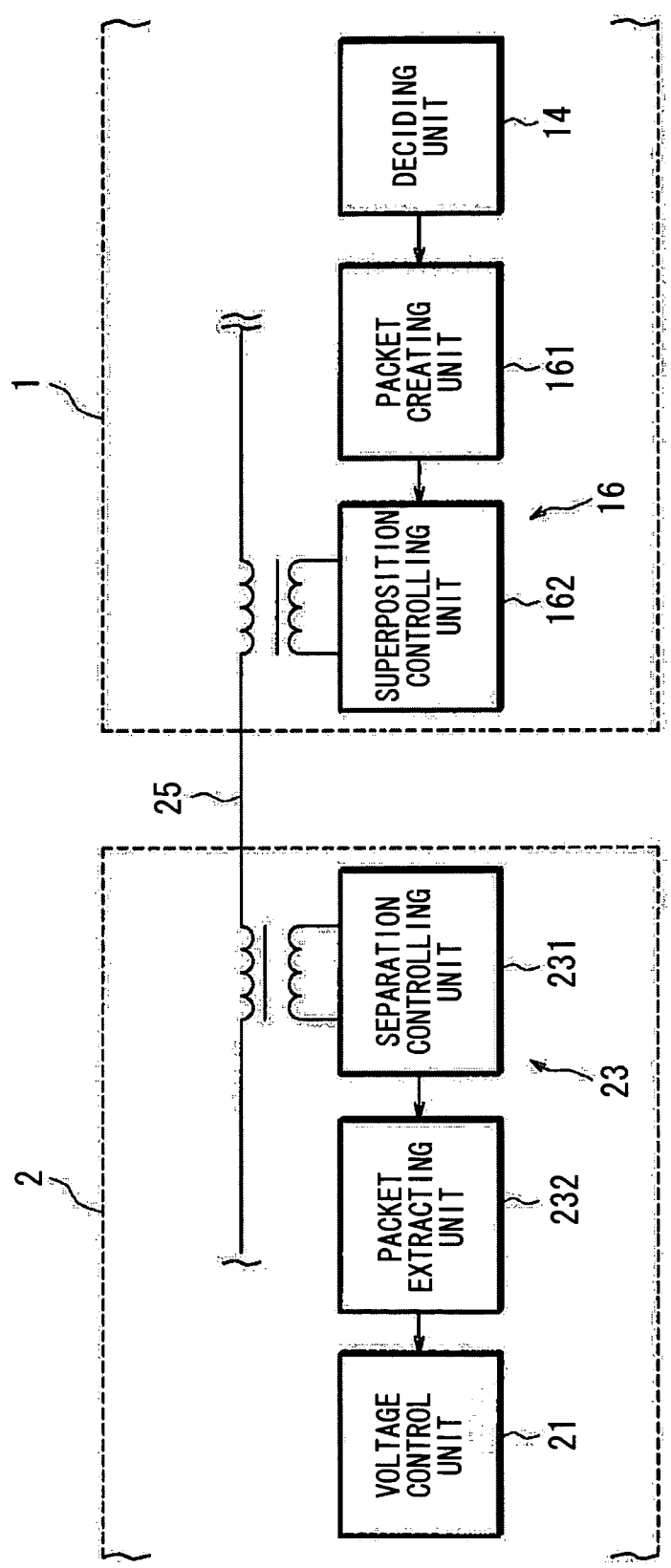
FIG. 12 illustrates two communication units according to a third embodiment.

FIG. 12 illustrates communication units 16 and 23 according to the third embodiment.

A packet creating unit 161 and a superposition controlling unit 162 are connected to the deciding unit 14 in the personal computer 1, as the communication unit 16 (output unit).

The deciding unit 14 outputs a digital signal relative to a voltage value to the packet creating unit 161.

The packet creating unit 161 describes the information indicating that it is the voltage value to be output to the personal computer 1 in the header, packets the digital signal relative to the voltage value, and outputs the same to the superposition controlling unit 162.

The superposition controlling unit 162 superimposes the digital signal relative to the voltage value on the power line 25 through a signal coupling transformer.

A packet extracting unit 232 and a separation controlling unit 231 are connected to the voltage control unit 21 of the AC adaptor 2, as the communication unit 23.

The separation controlling unit 231 separates (splits) the digital signal relative to the voltage value superimposed on the power line 25 through the signal coupling transformer.

The separation controlling unit 231 outputs the separated digital signal relative to the voltage value to the packet extracting unit 232.

The packet extracting unit 232 combines all the packets of the digital signal relative to the voltage value.

The packet extracting unit 232 outputs the combined digital signal relative to the voltage value to the voltage control unit 21.

As the result, it is possible to transmit a signal relative to a voltage value through addition of simple hardware.

Another exemplary embodiment is disclosed below.

A fourth embodiment relates to a form of setting weight in every DC-DC converter 100 for respective hardware units.

Figure 13:
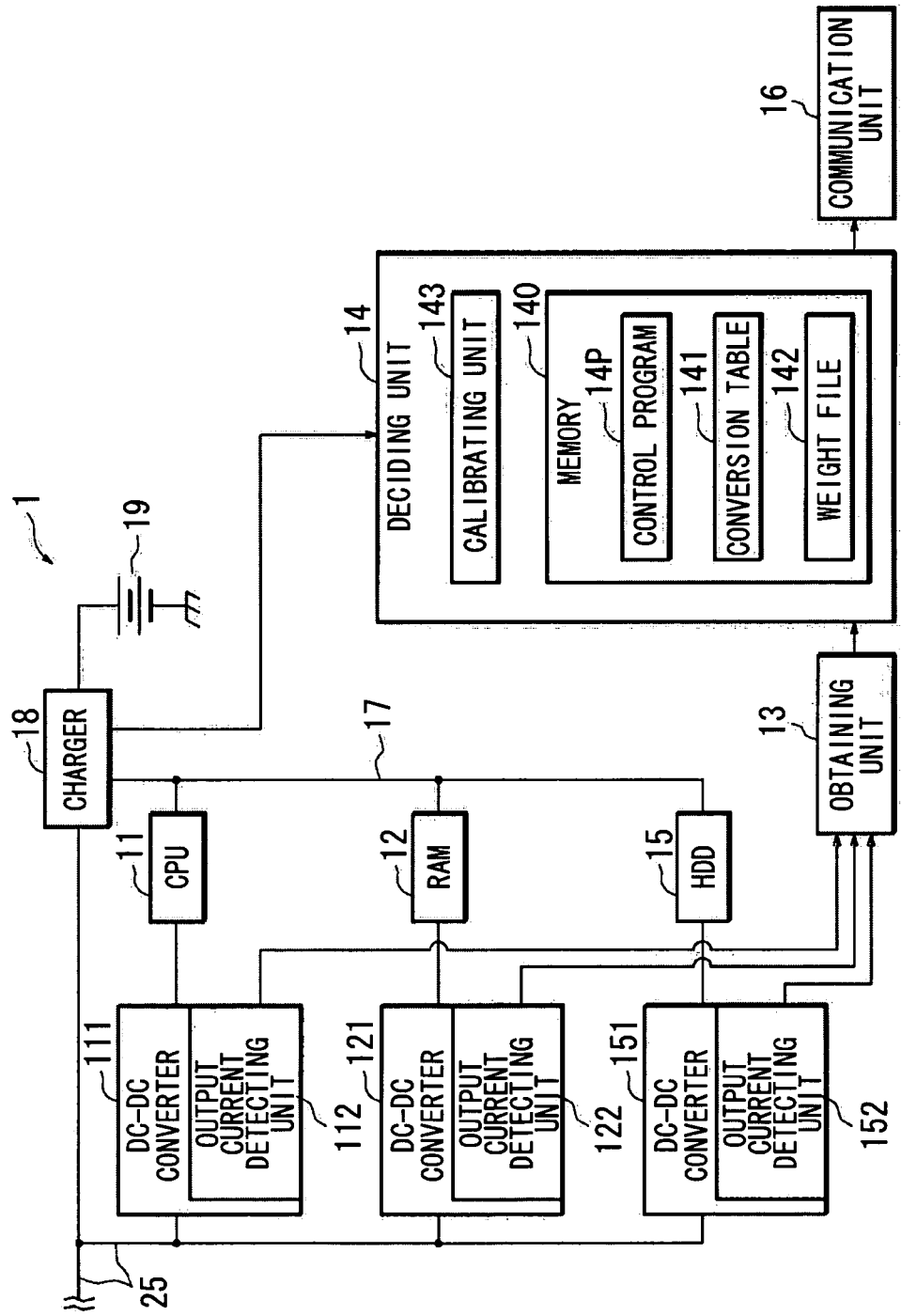
FIG. 13 illustrates an exemplary hardware of a personal computer according to a fourth embodiment.

FIG. 13 illustrates hardware of a personal computer 1 according to the fourth embodiment.

The deciding unit 14 is newly provided with a calibrating unit 143 and a weight file 142 is stored in the memory 140.

The calibrating unit 143 calibrates an output current from the output current detecting unit 112 corresponding to the CPU 11, an output current from the output current detecting unit 122 corresponding to the RAM 12, and an output current from the output current detecting unit 152 corresponding to the HDD 15, with reference to the weight file 142.

FIG. 14 is a view for use in describing the record layout of the weight file 142.

As a weight storing unit, the weight file 142 includes a target hardware field and a weight field.

The weight file 142 stores each weight corresponding to each kind of the hardware units.

For example, a weight 1.2 is stored as for the output current from the output current detecting unit 112, indicating the current consumption of the CPU 11.

Further, a weight 0.95 is stored as for the output current from the output current detecting unit 122, indicating the current consumption of the RAM 12.

Here, the weight file 142 stores correspondences respectively between the CPU 11 and the output current detecting unit 112, the RAM 12 and the output current detecting unit 122, and the HDD 15 and the output current detecting unit 152, although it does not illustrate them.

The calibrating unit 143 multiplies the output current from each of the output current detecting units 110 by the weight of the corresponding hardware unit, with reference to the weight file 142.

It outputs the total of the output currents from the respective output current detecting units 110 multiplied by the respective corresponding weights to the deciding unit 14 as the load information.

Referring to the conversion table 141, the deciding unit 14 reads out a voltage value corresponding to the total of the output currents from the conversion table 141.

The deciding unit 14 outputs the read voltage value to the communication unit 16.

This embodiment has given the description taking the example of multiplying the output current from each of the output current detecting units 110 by the corresponding weight; however, it is not restricted to this example.

For example, the conversion efficiency output from each of the conversion efficiency output units 120 having been described in the second embodiment may be multiplied by the weight.

Accordingly, it is possible to do a flexible design according to the importance of each hardware unit inside the personal computer 1.

Figure 15:
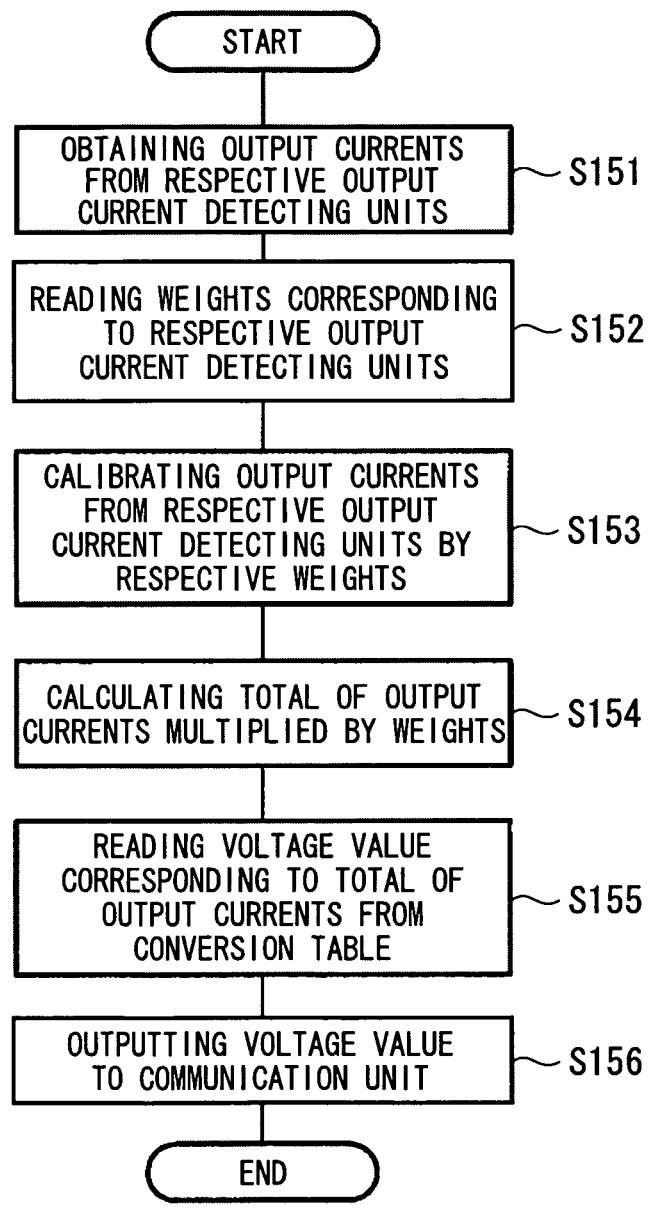
FIG. 15 illustrates an exemplary procedure of calibration processing.

FIG. 15 illustrates the procedure of the calibration processing.

The deciding unit 14 obtains the output currents from the respective output current detecting units 110 through the obtaining unit 13 (Operation S151).

The calibrating unit 143 reads out the respective weights corresponding to the respective output current detecting units 110 (Operation S152).

The calibrating unit 143 calibrates the respective output currents by multiplying the respective output currents from the respective output current detecting units 110 obtained in Operation S151 by the respective weights (Operation S153).

The calibrating unit 143 outputs the calibrated output currents relative to the respective hardware units to the deciding unit 14.

The deciding unit 14 calculates the total of the output currents multiplied by the weights (Operation S154).

The deciding unit 14 reads out a voltage value corresponding to the total of the calibrated output currents from the conversion table 141 (Operation S155).

At last, the deciding unit 14 outputs the voltage value to the communication unit 16 (Operation S156).

The fourth embodiment includes similar items to first to the third embodiments; therefore, the same reference numerals as used in the above embodiments are respectively attached to the corresponding identical components and their detailed description is omitted.

A fifth embodiment relates to a form of obtaining load information from software of measuring the situation of a load of each hardware unit.

Figure 16:
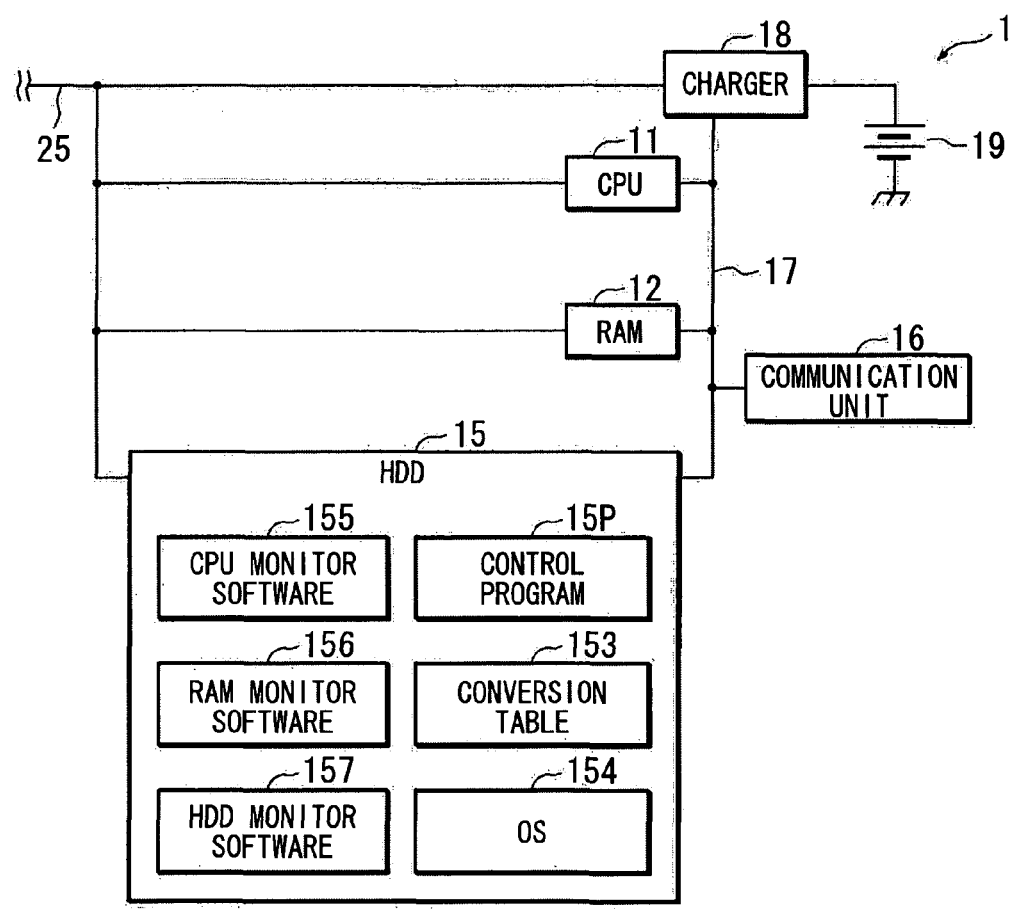
FIG. 16 illustrates an exemplary hardware of a personal computer according to a fifth embodiment.

FIG. 16 illustrates an example of the hardware of a personal computer 1 according to the fifth embodiment.

The personal computer 1 includes the charger 18, the battery 19, the RAM 12, the communication unit 16, and the HDD 15.

In this embodiment, the processing having been performed by the output current detecting units 110, the obtaining unit 13, and the deciding unit 14 is executed by a control program 15P installed in the HDD 15.

The CPU monitor software module 155, the RAM monitor software module 156, and the HDD monitor software module 157 running on the OS (Operating System) 154 are stored in the HDD 15.

The CPU monitor software module 155 measures a load rate (load situation) of the CPU 11 as the load information and outputs it to the CPU 11.

When the CPU 11 has a plurality of processors such as dual core processor and the like, the average value of the load rates of the respective processors may be defined as the load rate of the CPU 11.

The RAM monitor software module 156 measures a load rate of the RAM 12 and outputs it to the CPU 11.

The CPU monitor software module 155 and the RAM monitor software module 156 may use the software, for example, Performance-Meter provided by Google.

The HDD monitor software module 157 calculates (measures) a load rate from the access frequency to the HDD 15 based on the ATA (Advanced Technology Attachment) Standard.

The calculated load rate is output to the CPU 11.

In the embodiment, the hardware to be monitored is defined as three: CPU 11, RAM 12, and HDD 15; however, it may be defined as one or four and more.

For example, a LAN card may be monitored by measuring a load rate of the LAN card according to the data transmission amount per time unit of the LAN card.

Alternatively, the duty ratio of a backlight in a display unit, not illustrated, may be monitored as the load ratio of the display unit.

The CPU 11 obtains the load rates supplied from the CPU monitor software module 155, the RAM monitor software module 156, and the HDD monitor software module 157 (hereinafter, represented by the monitor software modules 150).

The CPU 11 calculates the average of the load rates.

The CPU 11 reads out a voltage value corresponding to the average load rate from the conversion table 141.

FIGS. 17A and 17B are views for use in describing the record layouts of the conversion tables 141.

FIG. 17A stores the respective voltage values corresponding to the respective CPU load rates.

The conversion table 141 includes a CPU load rate field and a voltage value field.

It stores the voltage values in the order of increasing according to an increase in the CPU load rate.

FIG. 17B stores the respective voltage values corresponding to the respective average load rates.

The conversion table 141 includes an average load rate field and a voltage value field.

It stores the voltage values in the order of increasing according to an increase in the value of the average load rate field.

This embodiment gives the description taking an example of using the average load rate of the load rates output from the respective monitor software modules 150.

Where, only the load rate of the single monitor software module 150, for example, the CPU 11 monitor software module 155 may be used.

The CPU 11 reads out a voltage value corresponding to the calculated average load rate from the conversion table 141 and outputs it to the communication unit 16.

This embodiment describes the example of storing the respective voltage values corresponding to the respective average load rates; however, the respective voltage values corresponding to the respective total load rates may be stored in the conversion table 141.

In this case, the CPU 11 requires the total of the load rates output from the respective monitor software modules 150.

The CPU 11 reads out a voltage value corresponding to the required total from the conversion table 141.

In the above hardware, the procedure of the voltage value calculating processing will be described by using a flow chart.

Figure 18:
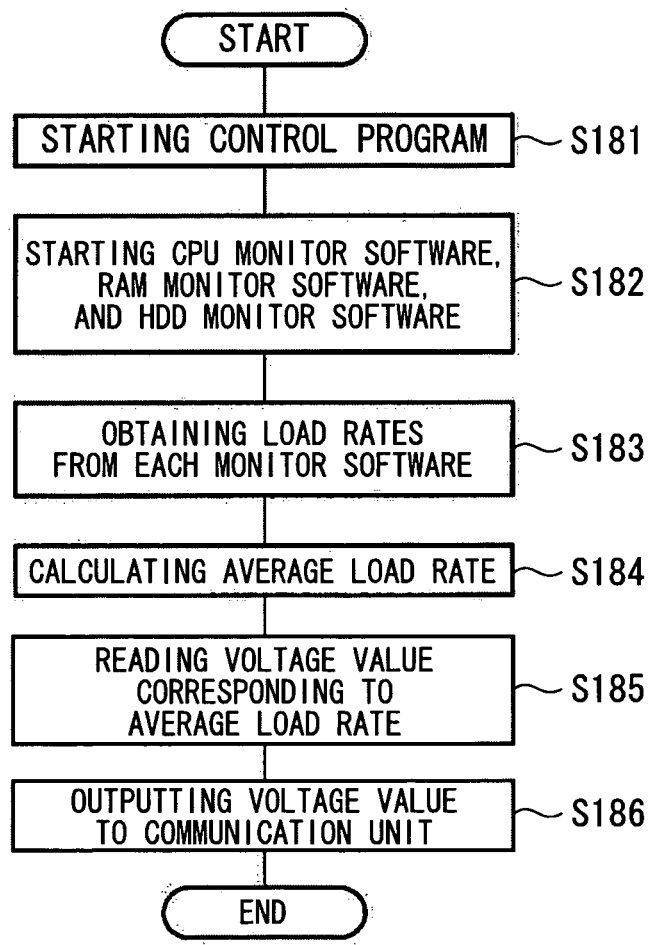
FIG. 18 illustrates an exemplary procedure of voltage value calculating processing.

FIG. 18 is a flow chart illustrating the procedure of the voltage value calculating processing.

The CPU 11 starts the control program 15P (Operation S181).

The CPU 11 starts the CPU monitor software module 155, the RAM monitor software module 156, and the HDD monitor software module 157 (Operation S182).

The CPU 11 obtains the load rates from the respective monitor software modules 150 (Operation S183).

The CPU 11 calculates the average load rate by dividing the obtained load rate by the total of the hardware to be monitored (Operation S184).

The CPU 11 reads out a voltage value corresponding to the calculated average load rate from the conversion table 141 (Operation S185).

The CPU 11 outputs the calculated voltage value to the communication unit 16 (Operation S186).

According to this, it is possible to decide a voltage value to be output by the AC adaptor 2 easily without installing special hardware.

The fifth embodiment is as mentioned above and the other structure is the same as that of the first to the fourth embodiments; therefore, the same reference numerals as used in the above embodiments are respectively attached to the corresponding identical components and their detailed description is omitted.

A sixth embodiment relates to a form of calibrating the load rates output by the respective monitor software modules 150.

Figure 19:
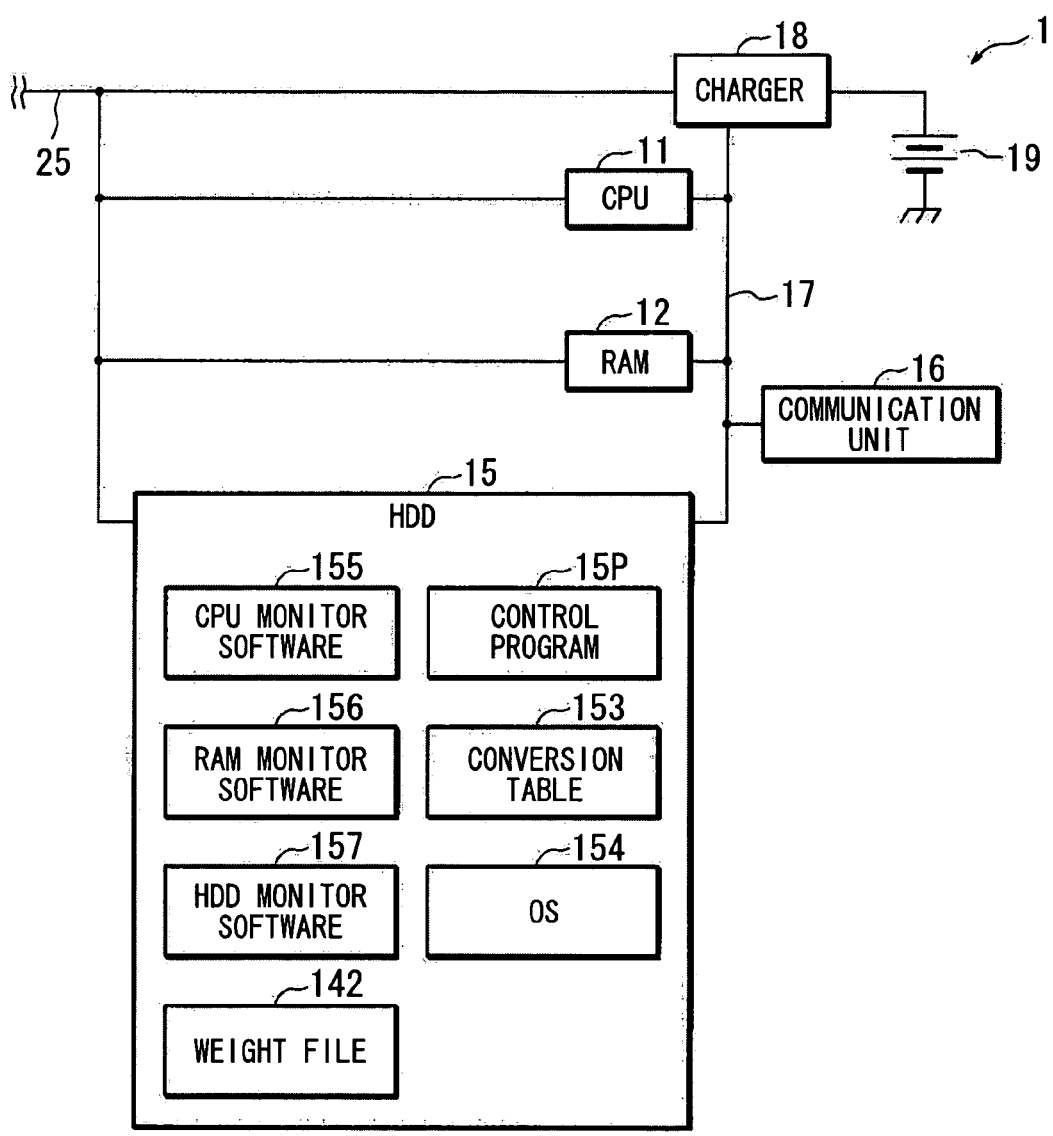
FIG. 19 illustrates an exemplary hardware of a personal computer according to a sixth embodiment.

FIG. 19 illustrates hardware of a personal computer 1 according to the sixth embodiment.

The weight file 142 is further stored in the HDD 15.

The weight file 142 stores each weight for use in calibration for each hardware unit, namely, each monitor software module 150 corresponding to each hardware, as illustrated in FIG. 14.

Here, the weights illustrated in FIG. 14 are by way of example and not restricted to these.

Figure 20:
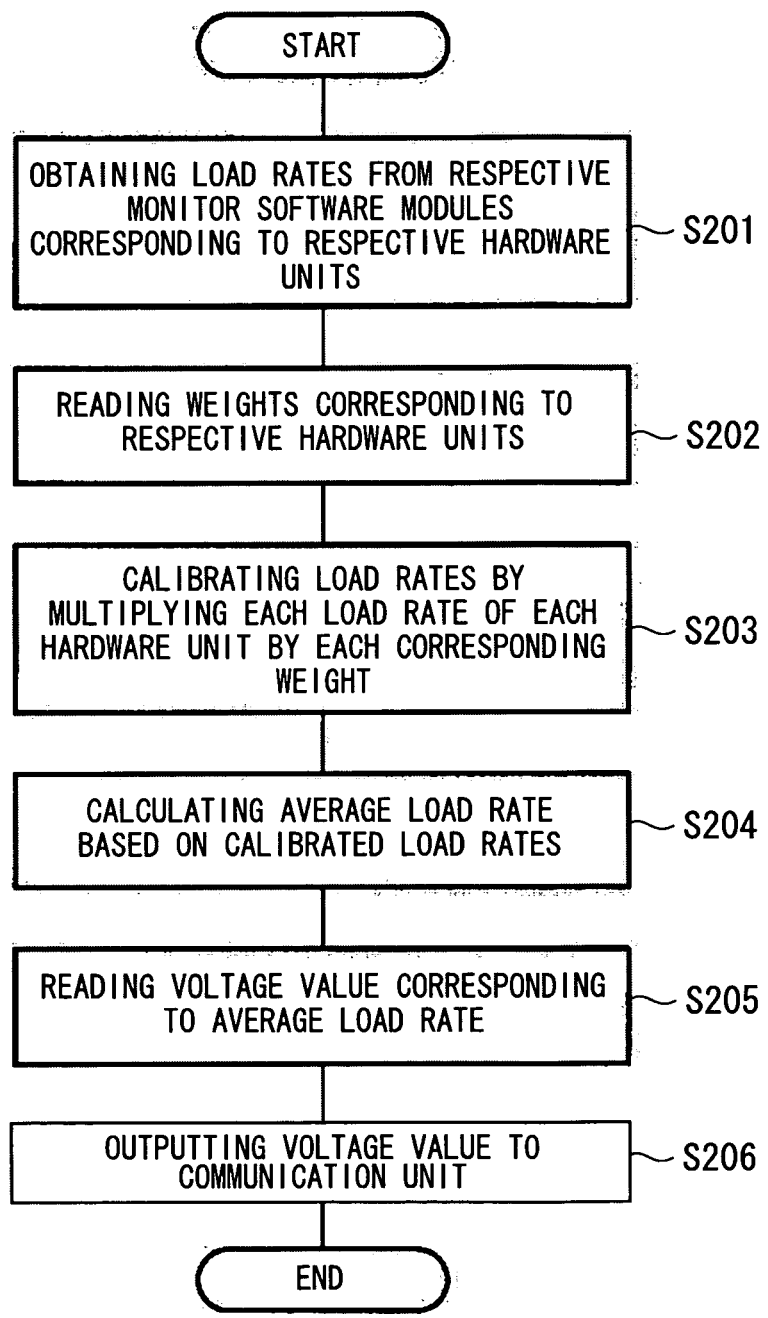
FIG. 20 illustrates an exemplary procedure of calibration processing.

FIG. 20 is a flow chart illustrating the procedure of calibration processing.

The processing later than Operation S182 in the fifth embodiment will be performed.

The CPU 11 obtains the load rates from the respective monitor software modules 150 corresponding to the respective hardware units (CPU 11, RAM 12, and HDD 15) (Operation S201).

The CPU 11 reads out the respective weights corresponding to the respective hardware units from the weight file 142 (Operation S202).

The CPU 11 calibrates the respective load rates by multiplying the respective load rates of the respective hardware units by the respective corresponding weights (Operation S203).

The CPU 11 calculates the average load rate according to the calibrated load rates (Operation S204).

The CPU 11 reads out a voltage value corresponding to the average load rate from the conversion table 141 (Operation S205).

The CPU 11 supplies the calculated voltage value to the communication unit 16 (Operation S206).

According to this, it is possible to set a voltage value taking the importance of the respective hardware units into consideration, or taking into consideration the accuracy and the balance between the respective monitor software modules 150.

The sixth embodiment includes other structure is the same as that of the first to the fifth embodiments; therefore, the same reference numerals as used in the above embodiments are respectively attached to the corresponding identical components and their detailed description is omitted.

A seventh embodiment relates to a form of using a combination of both the load information based on the output currents and the load information based on the load rates of the monitor software module 150.

Figure 21:
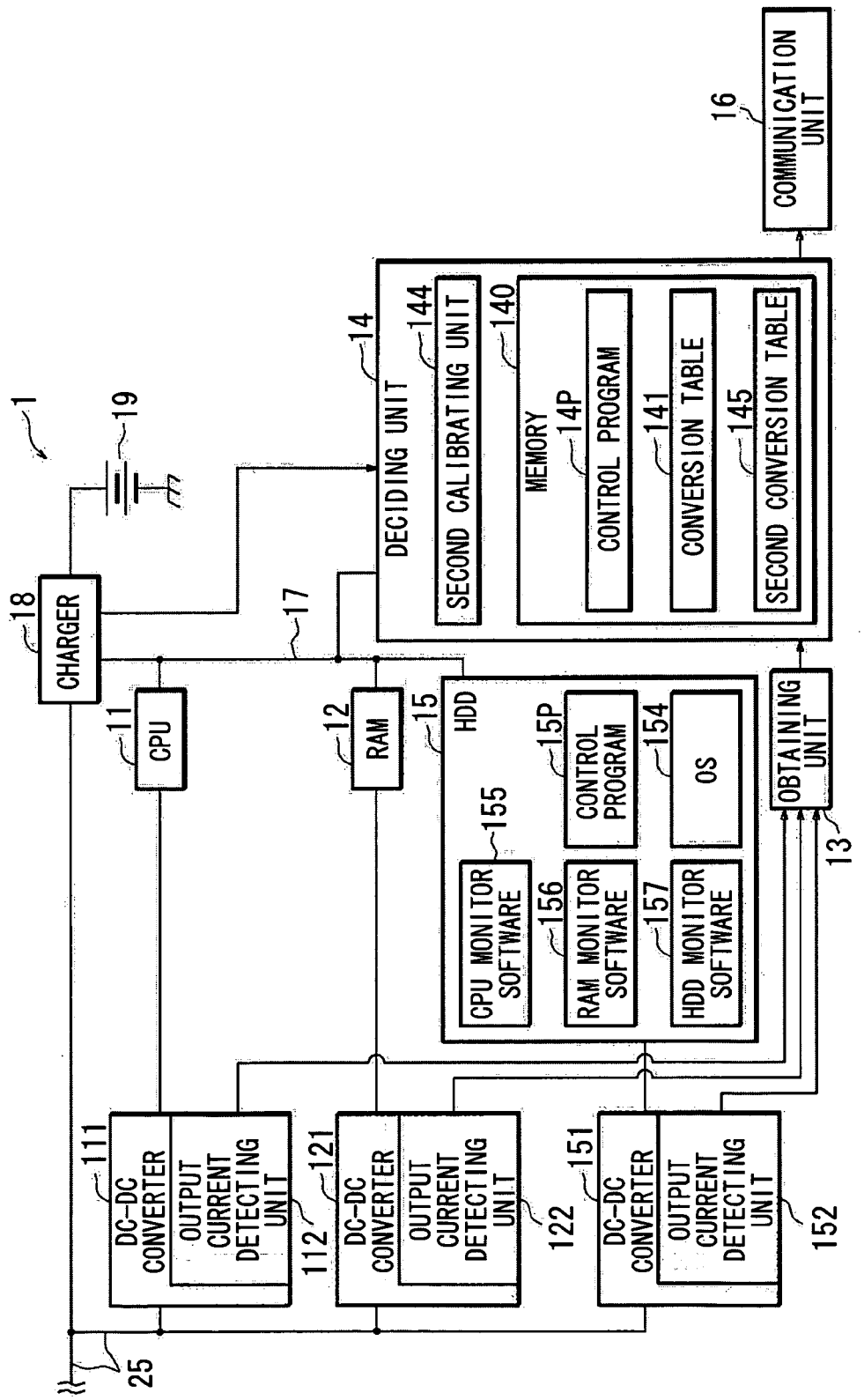
FIG. 21 illustrates an exemplary hardware of a personal computer according to a seventh embodiment.

FIG. 21 illustrates a personal computer 1 according to the seventh embodiment.

The deciding unit 14 further includes a second calibrating unit 144 and has a second conversion table 145 stored in the memory 140.

The deciding unit 14 is connected to the CPU 11 through a bus 17, to transmit and receive information to and from the CPU 11.

As the second obtaining unit, the CPU monitor software module 155, the RAM monitor software module 156, and the HDD monitor software module 157 are stored in the HDD 15.

The obtaining unit 13 as the first obtaining unit obtains the output currents output from the respective output current detecting units 110.

The obtaining unit 13 outputs the obtained output current to the deciding unit 14.

This embodiment gives the description of the form of using the output currents from a plurality of hardware units; however, only the output current from one hardware unit may be used.

The deciding unit 14 calculates the total of the output currents according to the control program 14P.

The deciding unit 14 outputs the calculated total of the output currents to the second calibrating unit 144.

The second calibrating unit 144 converts the total of the output currents into a load rate, with reference to the second conversion table 145.

FIG. 22 illustrates the record layout of the second conversion table 145.

The second conversion table 145 includes an output current total field and a load rate field.

The second conversion table 145 stores the respective load rates in accordance with the respective totals of the output currents.

It stores the load rates in the order of increasing according to an increase in the total of the output currents.

The second calibrating unit 144 reads out a load rate corresponding to the total of the output currents from the second conversion table 145 and returns the read load rate to the deciding unit 14.

Through the processing described in the fifth embodiment, the CPU 11 calculates the average load rate according to the control program 15P and supplies it to the deciding unit 14.

The deciding unit 14 calculates the final average load rate according to the average value of the load rate obtained from the obtaining unit 13 as the first obtaining unit and the load rates obtained by the monitor software modules 150 as the second obtaining unit.

The deciding unit 14 reads out a voltage value corresponding to the calculated average load rate, with reference to the conversion table 141 illustrated in FIG. 17B.

The deciding unit 14 outputs the read voltage value to the communication unit 16.

Here, this embodiment has given the description of the example of converting the output current into the load rate through the second conversion table 145; however, it is not restricted to this example.

On the contrary, the CPU 11 may output the output current corresponding to the average load rate to the deciding unit 14, with reference to a table for converting a load rate into an output current.

In this case, the deciding unit 14 obtains the average output current of the total sum of the output current output from the CPU 11 and the output currents in total obtained by the obtaining unit 13.

The deciding unit 14 reads out a voltage value corresponding to the average output current from the conversion table 141 illustrated in FIG. 4B.

Although this embodiment has described the form of using the output current, the average conversion efficiencies of the respective hardware units required based on the output currents, as illustrated in FIG. 6, may be used.

In this case, the second calibrating unit 144 calibrates the average conversion efficiency to the load rate, with reference to the second conversion table 145 which stores the load rates in accordance with the average conversion efficiencies.

Further, the weighing processing having been described in the fourth and sixth embodiments may be applied here.

Figure 23:
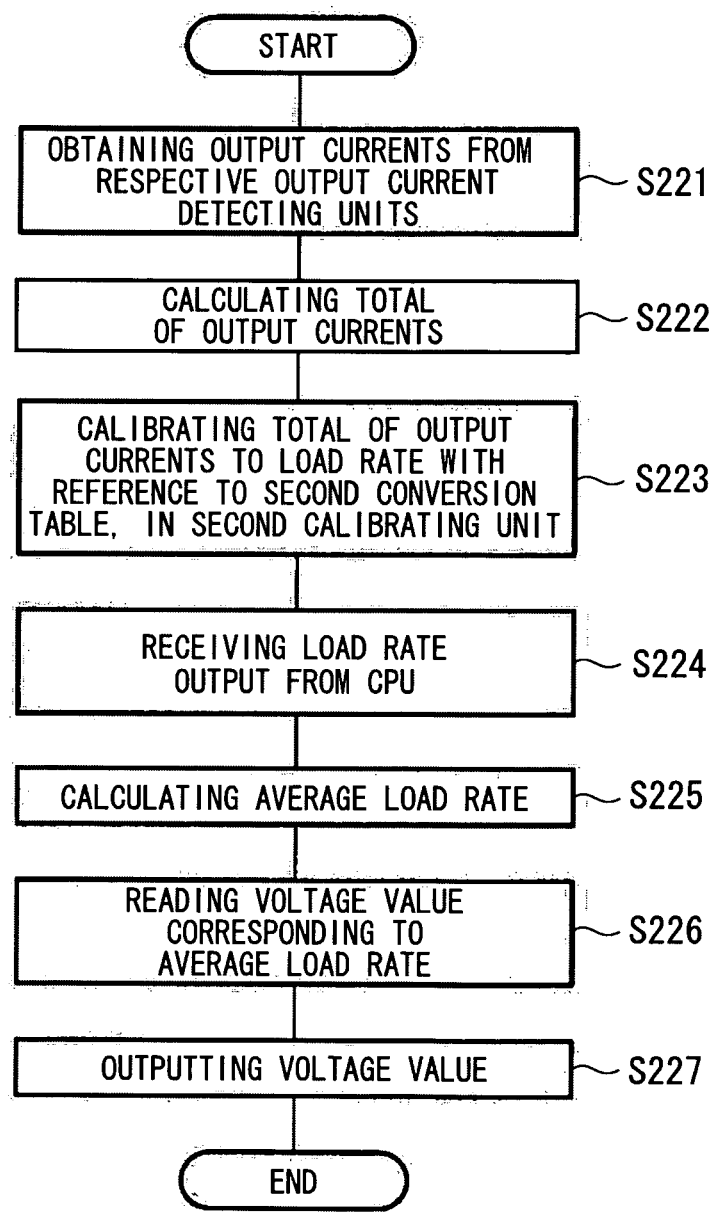
FIG. 23 illustrates an exemplary procedure of voltage value deciding processing according to an exemplary seventh embodiment.

FIG. 23 illustrates a voltage value deciding processing according to the seventh embodiment.

The deciding unit 14 obtains the output currents output from the respective output current detecting units 110 through the obtaining unit 13 (Operation S221).

The deciding unit 14 calculates the total of the output currents (Operation S222).

The second calibrating unit 144 calibrates the calculated total of the output currents to the load rate, with reference to the second conversion table 145 (Operation S223).

The deciding unit 14 accepts the load rate supplied from the CPU 11 (Operation S224).

The deciding unit 14 calculates the average load rate of the load rate calibrated in Operation S223 and the load rate accepted in Operation S224 (Operation S225).

The deciding unit 14 reads out a voltage value corresponding to the average load rate from the conversion table 141 (Operation S226).

The deciding unit 14 outputs the voltage value to the communication unit 16 (Operation S227).

According to this, it is possible to decide a voltage value with both the output current of the DC-DC converter 100 and the load rate of the monitor software 150 totally taken into consideration.

The seventh embodiment includes other items similar as that of the first to the sixth embodiments; therefore, the same reference numerals as used in the above embodiments are respectively attached to the corresponding identical components and their detailed description is omitted.

An eighth embodiment is different from the seventh embodiment in that the control program 15P executes the voltage value deciding processing.

Figure 24:
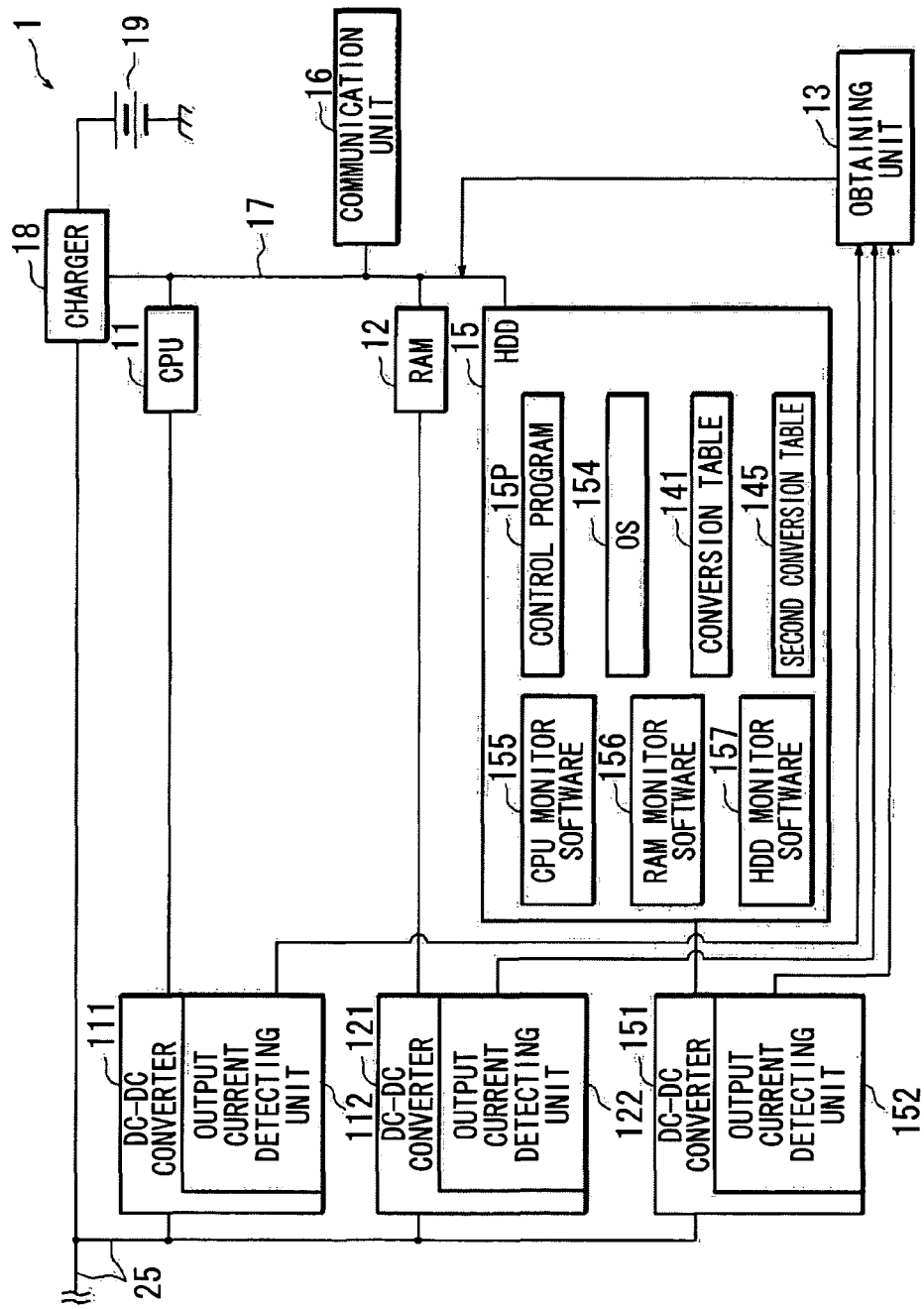
FIG. 24 illustrates an exemplary hardware of a personal computer according to an eighth embodiment.

FIG. 24 illustrates the hardware of a personal computer according to the eighth embodiment.

As the first obtaining unit, the obtaining unit 13 is provided.

Further, the monitor software modules 150 work as the second obtaining unit.

The obtaining unit 13 obtains the output currents output from the respective output current detecting units 110.

The obtaining unit 13 outputs the respective obtained output currents or the total of the output currents to the CPU 11.

Here, the following description will be made assuming that the obtaining unit 13 outputs the total of the output currents.

Instead of the output current, the conversion efficiency required based on the output current, as illustrated in FIG. 6, may be used.

The second conversion table 145 illustrated in FIG. 22 is stored in the HDD 15.

The CPU 11 starts the control program 15P to perform the following processing.

Figure 25:
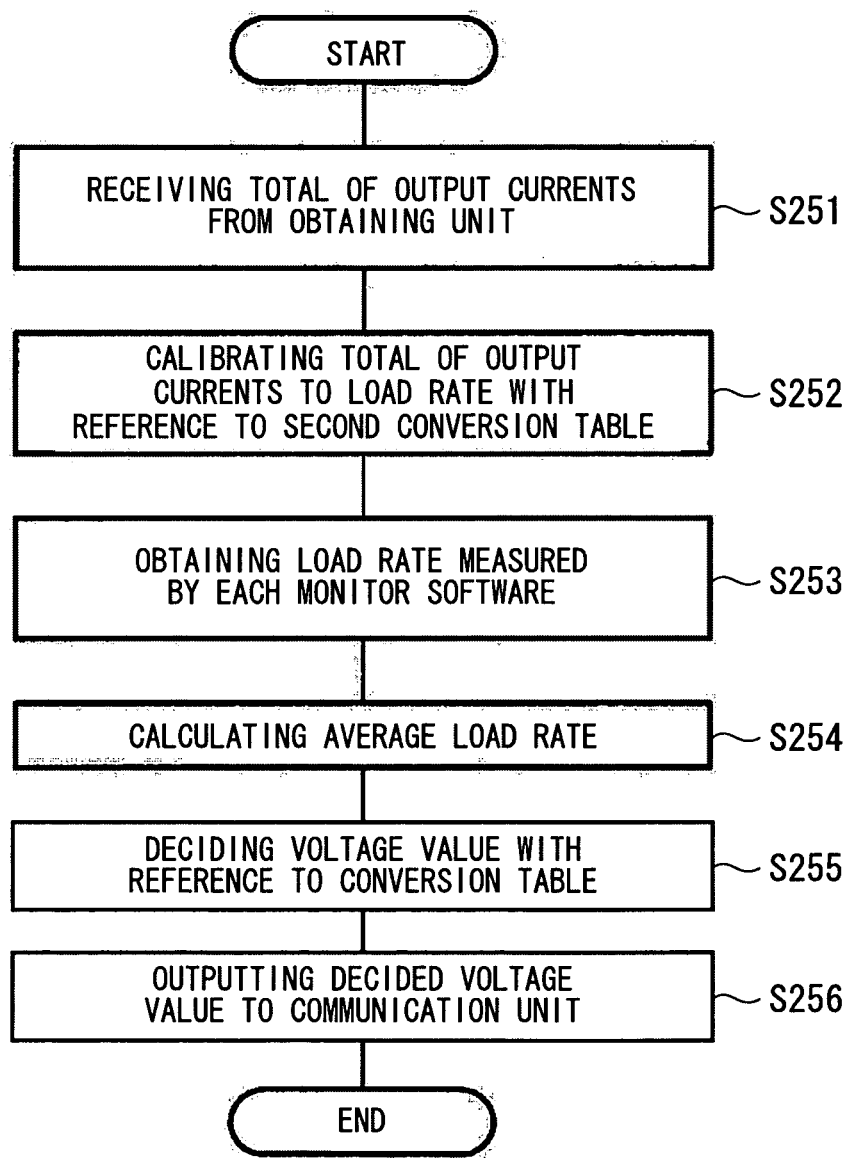
FIG. 25 illustrates an exemplary procedure of voltage value deciding processing according to an exemplary eighth embodiment.

FIG. 25 illustrates a voltage value deciding processing.

After NO in Operation S52 in the first embodiment, the following processing will be performed.

The CPU 11 receives the total of the output currents which the obtaining unit 13 obtains from the output current detecting unit 110 (Operation S251).

The CPU 11 calibrates the total of the output currents to the load rate, with reference to the second conversion table 145 (Operation S252).

The CPU 11 obtains the load rates measured by the respective monitor software modules 150 (Operation S253).

The CPU 11 calculates the average load rate (Operation S254) based on the load rate calibrated in Operation S252 and the load rate obtained in Operation S253.

The total sum of the load rate calibrated in Operation S252 and the load rates measured in the CPU monitor software module 155, the RAM monitor software module 156, and the HDD monitor software module 157 is divided by four, hence to require the average value.

The CPU 11 decides a voltage value corresponding to the average load rate, with reference to the conversion table 141 (Operation S255).

At last, the CPU 11 outputs the decided voltage value to the communication unit 16 (Operation S256).

According to this, it is possible to decide a voltage value, taking into consideration both the load information based on the output currents and the load information based on the load rates of the monitor software modules 150, in a simple structure.

The eighth embodiment includes other items similar as that of the first to the seventh embodiments; therefore, the same reference numerals as used in the above embodiments are respectively attached to the corresponding identical components and their detailed description is omitted.

Figure 26:
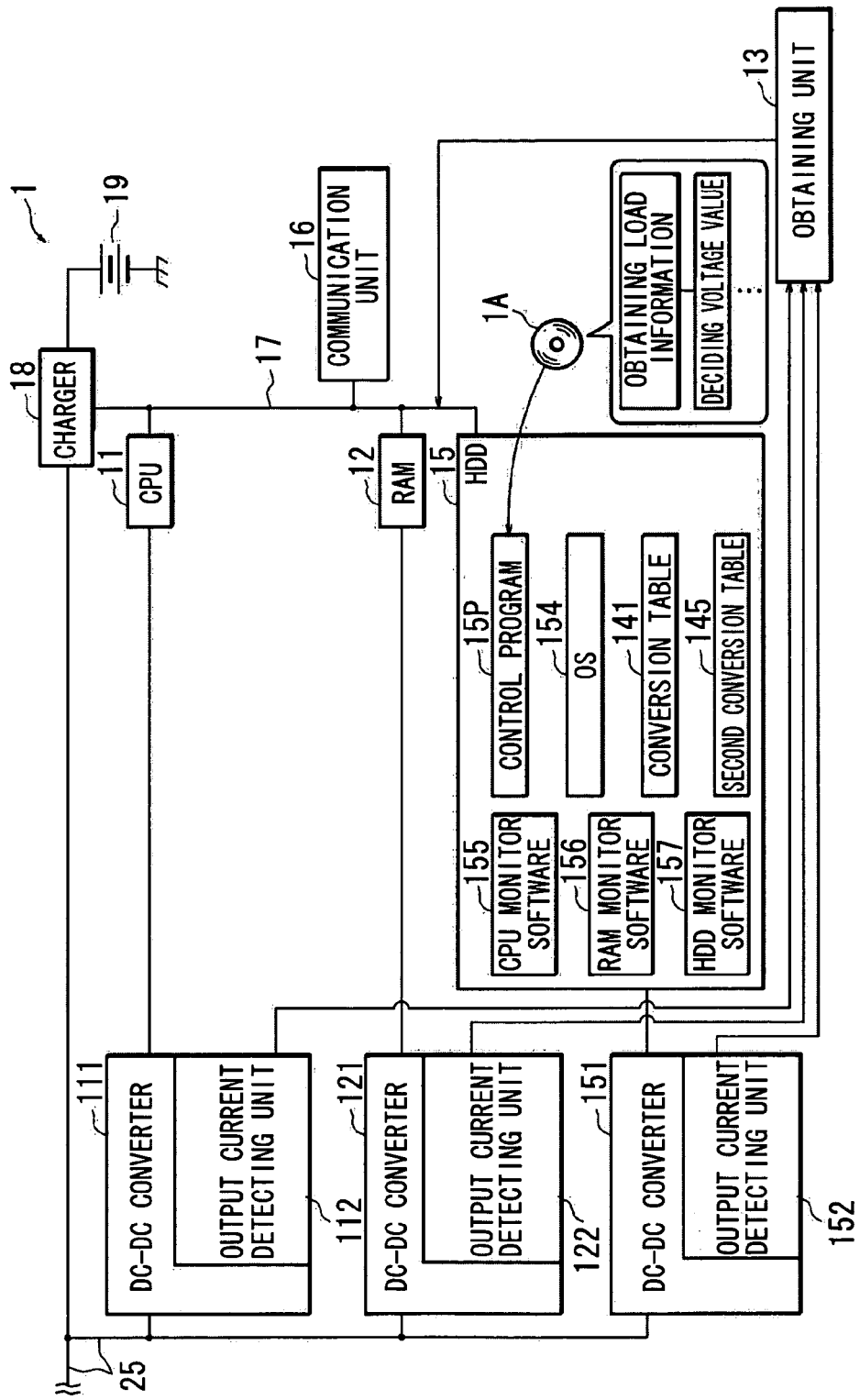
FIG. 26 illustrates an exemplary hardware of a personal computer according to a ninth embodiment.

FIG. 26 illustrates hardware of a personal computer 1 according to the ninth embodiment.

A program for running the personal computer 1 according to the first to the eighth embodiments, as shown in the ninth embodiment, may be realized by making a reading unit (not illustrated) read data from a portable recording medium 1A such as CD-ROM and storing it in the HDD 15 or the memory 140 illustrated, for example, in FIG. 3.

Alternatively, the program may be downloaded from another server computer (not illustrated) connected to a communication network such as the Internet.

The exemplary contents will be hereinafter described.

The personal computer 1 illustrated in FIG. 26 downloads a program for obtaining load information and deciding a voltage value, from another server computer (not illustrated) through the portable recording medium 1A or through a communication network.

The program is installed as the control program 15P of the HDD 15 or the control program 14P of the memory 140 and loaded in the RAM 12 or the memory 140, hence to be executed.

Thus, it works as the above-mentioned personal computer 1.

The ninth embodiment includes other items similar to the first to the eighth embodiments; therefore, the same reference numerals as used in the above embodiments are respectively attached to the corresponding identical components and their detailed description is omitted.

A tenth embodiment uses a controller installed in the personal computer 1.

Figure 27:
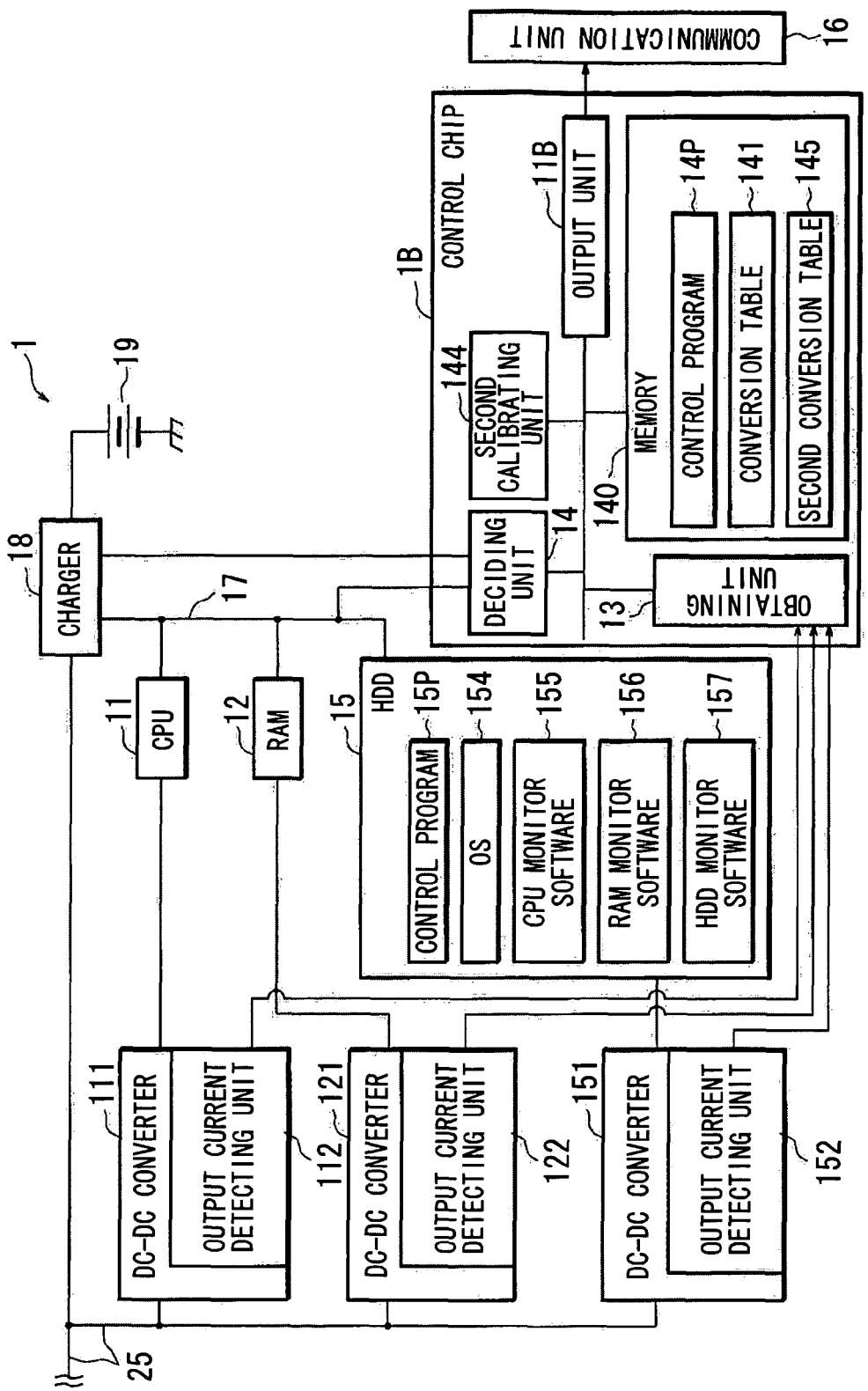
FIG. 27 illustrates an exemplary hardware of a personal computer according to a tenth embodiment.

FIG. 27 illustrates exemplary hardware of a personal computer 1 according to the tenth embodiment.

The controller is an LSI (Large-Scale Integration) chip (hereinafter, referred to a control chip 1B) including a microcomputer and a memory.

The control chip 1B includes the deciding unit 14 as a control unit, the second calibrating unit 144, the obtaining unit 13, the output unit 11B, and the memory 140.

When the load rates of the monitor software modules 150 are not used, the second calibrating unit 144 and the second conversion table 145 are not necessarily required.

The obtaining unit 13 obtains the output currents output from the output current detecting units 110.

The obtaining unit 13 outputs the output currents to the deciding unit 14.

The deciding unit 14 outputs the total value of the output currents to the second calibrating unit 144.

The second calibrating unit 144 calibrates the above value to the load rate, with reference to the second conversion table 145, through the above processing.

The load rate may be supplied to the deciding unit 14.

The deciding unit 14 receives the load rates of the respective monitor software modules 150 output from the CPU 11.

The deciding unit 14 calculates the average load rate based on the received load rates and the calibrated load rates.

The deciding unit 14 reads out a corresponding voltage value, with reference to the conversion table 141.

The deciding unit 14 outputs the read voltage value to the output unit 11B.

The output unit 11B outputs the voltage value to the communication unit 16.

Thus, it is possible to install the control chip 1B in various kinds of personal computers 1, to decide an appropriate voltage value for the AC adaptor 2, and to reduce the energy loss.

The tenth embodiment includes other items as disclosed for the first to the ninth embodiments; therefore, the same reference numerals are used in the disclosure of the above embodiments for corresponding identical components and their detailed description is omitted.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An information processing device comprising:
a first voltage converter; and a processor that executes a procedure including:
obtaining total load information for the information processing device including output currents obtained for at least one device in the information processing device;
deciding a voltage value to be output by a second converter, based on an average calculated for the output currents associated with the total load information, the second converter outputting an output voltage, the first voltage converter receiving and converting a voltage based on the output voltage of the second voltage converter; and
outputting a signal to the second voltage converter and corresponding to the voltage value decided by the deciding;
the at least one device in the information processing device includes a plurality of devices, and the deciding utilizes the average calculated from the total load information with respect to the plurality of devices in an expression to decide the voltage value to be output, wherein the deciding includes: referring to a conversion table which stores voltage values in accordance with the average calculated for the total load information regarding the plurality of devices, and deciding the output value based on the referring.

2. The information processing device according to claim 1, wherein the total load information includes an information based on an output current of the first voltage converter, and
the deciding decides the voltage value to be output by the second voltage converter, based on the information.

3. The information processing device according to claim 1, wherein the total load information is a conversion efficiency corresponding to an output current of the first voltage converter, and
the deciding decides the voltage value to be output by the second voltage converter, based on the conversion efficiency.

4. The information processing device according to claim 1, wherein the at least one device in the information processing device includes a plurality of devices, the information processing device including a memory,
the procedure includes:
calibrating the total load information of the plurality of devices obtained by the obtaining, based on respective weights in accordance with each of the plurality of devices stored in the memory, and
the deciding decides the voltage value to be output by the second voltage converter, based on the total load information of the plurality of devices calibrated by the calibrating.

5. The information processing device according to claim 1, wherein the obtaining obtains the total load information from software measuring a load situation of the at least one device in the information processing device.

6. The information processing device according to claim 1, wherein the at least one device in the information processing device includes a plurality of devices,
the obtaining obtains the total load information relative to the plurality of devices according to software measuring each load situation of the plurality of devices, and
the deciding decides the voltage value to be output by the second voltage converter, based on the total load information relative to the plurality of devices obtained by the obtaining.

7. The information processing device according to claim 1, including a memory, wherein the at least one device in the information processing device includes a plurality of devices, and
the obtaining obtains the total load information relative to the plurality of devices, according to software measuring each load situation of a plurality of devices, and
the procedure includes:
calibrating the total load information of the plurality of devices obtained by the obtaining, based on respective weights in accordance with each of the plurality of devices stored in the memory, and
the deciding decides the voltage value to be output by the second voltage converter, based on the total load information of the plurality of devices calibrated by the calibrating.

8. The information processing device according to claim 1, wherein the total load information includes a first information and a second information,
and the obtaining includes:
obtaining the first information based on an output current of the first voltage converter, and
obtaining the second information according to software measuring a load situation of the plurality of devices, and
wherein the deciding decides the voltage value to be output by the second voltage converter, based on the first information and the second information.

9. The information processing device according to claim 8, the procedure including:
calibrating at least one of the first information and the second information, wherein
the deciding uses the calibrated first information or the second information converted by the calibrating.

10. An information processing system comprising:
an information processing device including a first voltage converter and a processor; and
a power unit including a second voltage converter, outputting an output voltage converted by the second voltage converter,
the processor of the information processing device executing a procedure including:
obtaining total load information for the information processing device including output currents obtained for at least one device in the information processing device,
deciding a voltage value to be output by the second voltage converter, based on an average calculated for the output currents associated with the total load information, and
outputting a signal corresponding to the voltage value decided by the deciding,
wherein the second voltage converter of the power unit converts the output voltage value into a voltage value corresponding to the signal, and a voltage based on the output voltage output by the power unit is input to the first voltage converter of the information processing device;
the at least one device in the information processing device includes a plurality of devices, and the deciding utilizes the average calculated from the total load information with respect to the plurality of devices in an expression to decide the voltage value to be output, wherein the deciding includes: referring to a conversion table which stores voltage values in accordance with the average calculated for the total load information regarding the plurality of devices, and deciding the output value based on the referring.

11. The information processing system according to claim 10, wherein the second voltage converter includes an AC-DC converter.

12. The information processing system according to claim 10, wherein the information processing device includes a battery, and
the information processing device operates by a power from the second voltage converter or the battery.

13. The information processing system according to claim 10, wherein the power unit includes a receiver that receives the signal by wireless communication.

14. A computer program product stored on a non-transitory computer readable medium, the computer program product including computer executable instructions that cause a computer to execute a process comprising:
obtaining total load information for the computer including output currents obtained for at least one device in the computer including a first voltage converter;
deciding a voltage value to be output by a second voltage converter, based on an average calculated for the output currents associated with the obtained total load information, the second voltage converter outputting an output voltage, the first voltage converter receiving and converting a voltage based on the output voltage of the second voltage converter; and
outputting a signal relative to the voltage value to the second voltage converter;
the at least one device in the computer includes a plurality of devices, and the deciding utilizes the average calculated from the total load information with respect to the plurality of devices in an expression to decide the voltage value to be output, wherein the deciding includes: referring to a conversion table which stores voltage values in accordance with the average calculated for the total load information regarding the plurality of devices, and deciding the output value based on the referring.

15. A controller installed in an information processing device including a first voltage converter, the controller comprising:

a processor that executes a procedure including:
obtaining total load information for the information processing device including output currents obtained for at least one device in the information processing device;
deciding a voltage value to be output by a second voltage converter, based on an average calculated for the output currents associated with the total load information, the second voltage converter outputting an output voltage, the first voltage converter receiving and converting a voltage based on the output voltage of the second voltage converter; and outputting a signal to the second voltage converter and corresponding to the voltage value;
the at least one device in the information processing device includes a plurality of devices, and the deciding utilizes the average calculated from the total load information with respect to the plurality of devices in an expression to decide the voltage value to be output, wherein the deciding includes: referring to a conversion table which stores voltage values in accordance with the average calculated for the total load information regarding the plurality of devices, and deciding the output value based on the referring.

16. A method of controlling an information processing device including a first voltage converter and a processor, the method comprising:
obtaining total load information for the information processing device including output currents obtained for at least one device in the information processing device;
deciding, using a processor, a voltage value to be output by a second voltage converter, based on an average calculated for the output currents associated with the obtained total load information, the first voltage converter receiving and converting a voltage based on the output voltage of the second voltage converter; and outputting a signal to the second voltage converter and corresponding to the decided voltage value;
the at least one device in the information processing device includes a plurality of devices, and the deciding utilizes the average calculated from the total load information with respect to the plurality of devices in an expression to decide the voltage value to be output, wherein the deciding includes: referring to a conversion table which stores voltage values in accordance with the average calculated for the total load information regarding the plurality of devices, and deciding the output value based on the referring.

17. A device including a processor and a first voltage converter, the processor executing a process comprising:
obtaining total load information for an information processing device including output currents obtained for at least one device in the information processing device;
deciding a voltage value to be output by a second voltage converter and to be input to the first voltage converter based on an average calculated for the output currents associated with the obtained total load information; and
outputting a signal to the second voltage converter and corresponding to the decided voltage value;
the at least one device in the information processing device includes a plurality of devices, and the deciding utilizes the average calculated from the total load information with respect to the plurality of devices in an expression to decide the voltage value to be output, wherein the deciding includes: referring to a conversion table which stores voltage values in accordance with the average calculated for the total load information regarding the plurality of devices, and deciding the output value based on the referring.

18. A method performed by a processor, comprising:
obtaining total load information for an apparatus including output currents obtained for at least one device in the apparatus, the apparatus including a first voltage converter;
deciding, by a processor, a voltage value to be output by a second voltage converter and to be input to the first voltage converter based on an average calculated for the output currents associated with the obtained total load information; and
outputting a signal to the second voltage converter and corresponding to the decided voltage value;
the at least one device in the apparatus includes a plurality of devices, and the deciding utilizes the average calculated from the total load information with respect to the plurality of devices in an expression to decide the voltage value to be output, wherein the deciding includes: referring to a conversion table which stores voltage values in accordance with the average calculated for the total load information regarding the plurality of devices, and deciding the output value based on the referring.

* * * * *